(12) United States Patent
Westwood

(10) Patent No.: US 8,668,975 B2
(45) Date of Patent: Mar. 11, 2014

(54) FABRIC WITH DISCRETE ELASTIC AND PLASTIC REGIONS AND METHOD FOR MAKING SAME

(75) Inventor: Alistair D. Westwood, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 524 days.

(21) Appl. No.: 12/940,445

(22) Filed: Nov. 5, 2010

(65) Prior Publication Data

US 2011/0123775 A1    May 26, 2011

Related U.S. Application Data

(60) Provisional application No. 61/264,009, filed on Nov. 24, 2009.

(51) Int. Cl.
*B32B 5/08* (2006.01)
*B32B 5/14* (2006.01)
*A61F 13/15* (2006.01)

(52) U.S. Cl.
USPC ........... 428/113; 428/212; 442/382; 442/389; 442/400; 604/370; 604/372; 604/385.01; 604/385.16; 604/393; 2/69

(58) Field of Classification Search
USPC .......... 428/113, 212; 442/381, 382, 389, 400, 442/401, 405; 604/367, 370, 372, 385.01, 604/385.16, 393; 2/69
See application file for complete search history.

(56) References Cited

U.S. PATENT DOCUMENTS

| | | |
|---|---|---|
| 3,149,178 A | 9/1964 | Hamilton et al. |
| 3,338,992 A | 8/1967 | Kinney |
| 3,341,394 A | 9/1967 | Kinney |
| 3,502,763 A | 3/1970 | Hartmann |
| 3,542,615 A | 11/1970 | Dobo et al. |
| 3,692,618 A | 9/1972 | Dorschner et al. |
| 3,802,817 A | 4/1974 | Matsuki et al. |
| 3,849,241 A | 11/1974 | Butin et al. |
| 4,042,740 A | 8/1977 | Krueger |
| 4,100,324 A | 7/1978 | Anderson et al. |
| 4,103,058 A | 7/1978 | Humlicek |
| 4,105,381 A | 8/1978 | Platt et al. |
| 4,116,892 A | 9/1978 | Schwarz |
| 4,144,008 A | 3/1979 | Schwarz |

(Continued)

FOREIGN PATENT DOCUMENTS

| | | |
|---|---|---|
| CA | 1 268 753 | 5/1990 |
| EP | 0 129 368 | 12/1984 |

(Continued)

OTHER PUBLICATIONS

Barden, B., "*Coated Fabrics*", Kirk-Othmer Encyclopedia of Chemical Technology, John Wiley & Sons, pp. 1-13 (1993).

(Continued)

*Primary Examiner* — Donald J Loney

(57) ABSTRACT

An in situ compositionally modulated meltspun fabric and method for making the same. The meltspun fabric has at least one layer comprising a plurality of discrete regions of fiber. At least two discrete regions of fiber are inelastic or extensible and at least one discrete region of fiber is elastic or extensible. The layer is compositionally modulated in the cross direction.

24 Claims, 5 Drawing Sheets

(56) References Cited

U.S. PATENT DOCUMENTS

| | | | |
|---|---|---|---|
| 4,153,751 A | 5/1979 | Schwarz | |
| 4,177,312 A | 12/1979 | Rasen et al. | |
| 4,209,563 A | 6/1980 | Sisson | |
| 4,223,059 A | 9/1980 | Schwarz | |
| 4,251,585 A | 2/1981 | Schwarz | |
| 4,252,590 A | 2/1981 | Rasen et al. | |
| 4,285,100 A | 8/1981 | Schwarz | |
| 4,289,832 A | 9/1981 | Schwarz | |
| 4,340,563 A | 7/1982 | Appel et al. | |
| 4,368,565 A | 1/1983 | Schwarz | |
| 4,380,570 A | 4/1983 | Schwarz | |
| 4,410,602 A | 10/1983 | Komoda et al. | |
| 4,461,872 A | 7/1984 | Su | |
| 4,540,753 A | 9/1985 | Cozewith et al. | |
| 4,657,802 A | 4/1987 | Morman | |
| 4,767,586 A * | 8/1988 | Radwanski et al. | 264/113 |
| 4,775,579 A | 10/1988 | Hagy et al. | |
| 4,818,464 A | 4/1989 | Lau | |
| 4,827,064 A | 5/1989 | Wu | |
| 4,827,073 A | 5/1989 | Wu | |
| 4,950,720 A | 8/1990 | Randall, Jr. et al. | |
| 4,965,122 A | 10/1990 | Morman | |
| 4,981,747 A | 1/1991 | Morman | |
| 5,017,714 A | 5/1991 | Welborn, Jr. | |
| 5,055,438 A | 10/1991 | Canich | |
| 5,057,475 A | 10/1991 | Canich et al. | |
| 5,078,935 A | 1/1992 | Kobayashi et al. | |
| 5,096,867 A | 3/1992 | Canich | |
| 5,108,820 A | 4/1992 | Kaneko et al. | |
| 5,108,827 A | 4/1992 | Gessner | |
| 5,114,787 A | 5/1992 | Chaplin et al. | |
| 5,130,076 A | 7/1992 | Blatz et al. | |
| 5,143,679 A | 9/1992 | Weber et al. | |
| 5,145,727 A | 9/1992 | Potts et al. | |
| 5,147,712 A | 9/1992 | Miyahara et al. | |
| 5,153,157 A | 10/1992 | Hlatky et al. | |
| 5,156,793 A | 10/1992 | Buell et al. | |
| 5,167,897 A | 12/1992 | Weber et al. | |
| 5,171,908 A | 12/1992 | Rudnick | |
| 5,182,162 A | 1/1993 | Andrusko | |
| 5,187,005 A | 2/1993 | Stahle et al. | |
| 5,188,885 A | 2/1993 | Timmons et al. | |
| 5,190,812 A | 3/1993 | Joseph et al. | |
| 5,198,401 A | 3/1993 | Turner et al. | |
| 5,226,992 A | 7/1993 | Morman | |
| 5,227,224 A | 7/1993 | Ishikawa et al. | |
| 5,230,949 A | 7/1993 | Howard et al. | |
| 5,234,423 A | 8/1993 | Alemany et al. | |
| 5,238,733 A | 8/1993 | Joseph et al. | |
| 5,240,894 A | 8/1993 | Burkhardt et al. | |
| 5,242,436 A | 9/1993 | Weil et al. | |
| 5,244,724 A | 9/1993 | Antonacci et al. | |
| 5,260,126 A | 11/1993 | Collier, IV et al. | |
| 5,264,405 A | 11/1993 | Canich | |
| 5,272,003 A | 12/1993 | Peacock | |
| 5,288,791 A | 2/1994 | Collier, IV et al. | |
| 5,292,389 A | 3/1994 | Tsuji et al. | |
| 5,294,482 A | 3/1994 | Gessner | |
| 5,306,545 A | 4/1994 | Shirayanagi et al. | |
| 5,320,891 A | 6/1994 | Levy et al. | |
| 5,324,576 A | 6/1994 | Reed et al. | |
| 5,324,580 A | 6/1994 | Allan et al. | |
| 5,324,800 A | 6/1994 | Welborn, Jr. et al. | |
| 5,330,458 A | 7/1994 | Buell et al. | |
| 5,330,829 A | 7/1994 | Miller | |
| 5,332,613 A | 7/1994 | Taylor et al. | |
| 5,334,636 A | 8/1994 | Fujii et al. | |
| 5,336,457 A | 8/1994 | Wu et al. | |
| 5,336,545 A | 8/1994 | Morman | |
| 5,346,756 A | 9/1994 | Ogale et al. | |
| 5,349,016 A | 9/1994 | DeNicola, Jr. et al. | |
| 5,358,500 A | 10/1994 | Lavon et al. | |
| 5,366,782 A | 11/1994 | Curro et al. | |
| 5,366,786 A | 11/1994 | Connor et al. | |
| 5,366,793 A | 11/1994 | Fitts, Jr. et al. | |
| 5,368,584 A | 11/1994 | Clear et al. | |
| 5,368,919 A | 11/1994 | Robeson | |
| 5,368,927 A | 11/1994 | Lesca et al. | |
| 5,372,885 A | 12/1994 | Tabor et al. | |
| 5,382,400 A | 1/1995 | Pike et al. | |
| 5,382,461 A | 1/1995 | Wu | |
| 5,385,775 A | 1/1995 | Wright | |
| 5,393,599 A | 2/1995 | Quantrille et al. | |
| 5,418,045 A | 5/1995 | Pike et al. | |
| 5,422,172 A | 6/1995 | Wu | |
| 5,425,987 A | 6/1995 | Shawver et al. | |
| 5,455,110 A | 10/1995 | Connor | |
| 5,464,401 A | 11/1995 | Hasse et al. | |
| 5,466,411 A | 11/1995 | Butterfass et al. | |
| 5,472,775 A | 12/1995 | Obijeski et al. | |
| 5,476,616 A | 12/1995 | Schwarz | |
| 5,482,765 A | 1/1996 | Bradley et al. | |
| 5,482,772 A | 1/1996 | Strack et al. | |
| 5,484,645 A * | 1/1996 | Lickfield et al. | 428/198 |
| 5,492,753 A | 2/1996 | Levy et al. | |
| 5,496,298 A | 3/1996 | Kuepper et al. | |
| 5,507,736 A | 4/1996 | Clear et al. | |
| 5,523,141 A | 6/1996 | Fyler | |
| 5,534,339 A | 7/1996 | Stokes | |
| 5,534,340 A | 7/1996 | Gupta et al. | |
| 5,536,563 A | 7/1996 | Shah et al. | |
| 5,540,976 A | 7/1996 | Shawver et al. | |
| 5,549,964 A | 8/1996 | Shohji et al. | |
| 5,556,392 A | 9/1996 | Koczab | |
| 5,573,841 A | 11/1996 | Adam et al. | |
| 5,575,783 A | 11/1996 | Clear et al. | |
| 5,591,152 A | 1/1997 | Buell et al. | |
| 5,593,768 A | 1/1997 | Gessner | |
| 5,607,798 A | 3/1997 | Kobylivker et al. | |
| 5,616,408 A | 4/1997 | Oleszczuk et al. | |
| 5,620,785 A | 4/1997 | Watt et al. | |
| 5,628,741 A | 5/1997 | Buell et al. | |
| 5,635,290 A | 6/1997 | Stopper et al. | |
| 5,641,445 A | 6/1997 | Fauble et al. | |
| 5,643,662 A | 7/1997 | Yeo et al. | |
| 5,645,542 A | 7/1997 | Anjur et al. | |
| 5,645,933 A | 7/1997 | Sakazume et al. | |
| 5,652,051 A | 7/1997 | Shawver et al. | |
| 5,653,704 A | 8/1997 | Buell et al. | |
| 5,672,415 A | 9/1997 | Sawyer et al. | |
| 5,674,216 A | 10/1997 | Buell et al. | |
| 5,681,646 A | 10/1997 | Ofosu et al. | |
| 5,688,157 A | 11/1997 | Bradley et al. | |
| 5,690,627 A | 11/1997 | Clear et al. | |
| 5,695,849 A | 12/1997 | Shawver et al. | |
| 5,695,868 A | 12/1997 | McCormack | |
| 5,698,480 A | 12/1997 | Geiman et al. | |
| 5,720,832 A | 2/1998 | Minto et al. | |
| 5,723,217 A | 3/1998 | Stahl et al. | |
| 5,733,822 A | 3/1998 | Gessner et al. | |
| 5,783,531 A | 7/1998 | Andrew et al. | |
| 5,804,286 A | 9/1998 | Quantrille et al. | |
| 5,817,403 A | 10/1998 | Gillyns et al. | |
| 5,824,613 A | 10/1998 | Geiman et al. | |
| 5,840,412 A | 11/1998 | Wood et al. | |
| 5,843,057 A | 12/1998 | McCormack | |
| 5,843,068 A | 12/1998 | Allen et al. | |
| 5,861,202 A | 1/1999 | Kimura et al. | |
| 5,866,488 A | 2/1999 | Terada et al. | |
| 5,874,160 A | 2/1999 | Keck | |
| 5,880,241 A | 3/1999 | Brookhart et al. | |
| 5,883,028 A | 3/1999 | Morman et al. | |
| 5,906,879 A | 5/1999 | Huntoon et al. | |
| 5,910,362 A | 6/1999 | Aratake et al. | |
| 5,914,084 A | 6/1999 | Benson et al. | |
| 5,914,184 A | 6/1999 | Morman | |
| 5,916,207 A | 6/1999 | Toyoda et al. | |
| 5,921,973 A | 7/1999 | Newkirk et al. | |
| 5,928,740 A | 7/1999 | Wilhoit et al. | |
| 5,942,451 A | 8/1999 | Daponte et al. | |
| 5,945,215 A | 8/1999 | Bersted et al. | |
| 5,952,252 A | 9/1999 | Shawver et al. | |
| 5,985,193 A | 11/1999 | Harrington et al. | |
| 5,993,714 A | 11/1999 | Sawyer et al. | |

(56) References Cited

U.S. PATENT DOCUMENTS

| | | |
|---|---|---|
| 5,994,244 A | 11/1999 | Fujiwara et al. |
| 6,015,605 A | 1/2000 | Tsujiyama et al. |
| 6,015,617 A | 1/2000 | Maugans et al. |
| 6,015,764 A | 1/2000 | McCormack et al. |
| 6,028,240 A | 2/2000 | Wessel et al. |
| 6,037,281 A | 3/2000 | Mathis et al. |
| 6,045,898 A | 4/2000 | Kishi et al. |
| 6,071,451 A | 6/2000 | Wang et al. |
| 6,075,179 A | 6/2000 | McCormack et al. |
| 6,080,818 A | 6/2000 | Thakker et al. |
| 6,083,583 A | 7/2000 | Klocek et al. |
| 6,090,472 A | 7/2000 | Wang et al. |
| 6,090,730 A | 7/2000 | Fujiwara et al. |
| 6,096,668 A | 8/2000 | Abuto et al. |
| 6,103,647 A | 8/2000 | Shultz et al. |
| 6,114,261 A | 9/2000 | Strelow et al. |
| 6,114,263 A | 9/2000 | Benson et al. |
| 6,117,546 A | 9/2000 | Geiman et al. |
| 6,140,551 A | 10/2000 | Niemeyer et al. |
| 6,207,237 B1 | 3/2001 | Haffner |
| 6,207,601 B1 | 3/2001 | Maurer et al. |
| 6,207,602 B1 | 3/2001 | Gessner et al. |
| 6,224,977 B1 | 5/2001 | Kobylivker et al. |
| 6,261,674 B1 | 7/2001 | Branham et al. |
| 6,268,203 B1 | 7/2001 | Johnson et al. |
| 6,268,302 B1 | 7/2001 | Ofosu et al. |
| 6,281,289 B1 | 8/2001 | Maugans et al. |
| 6,286,145 B1 | 9/2001 | Welchel et al. |
| 6,312,641 B1 | 11/2001 | Hutchinson |
| 6,323,389 B1 | 11/2001 | Thomas et al. |
| 6,342,565 B1 | 1/2002 | Cheng et al. |
| 6,352,426 B1 | 3/2002 | Hutchinson et al. |
| 6,355,348 B1 | 3/2002 | Takesue et al. |
| 6,362,389 B1 | 3/2002 | McDowall et al. |
| 6,372,172 B1 | 4/2002 | Sudduth et al. |
| 6,391,408 B1 | 5/2002 | Hutchinson |
| 6,410,465 B1 | 6/2002 | Lim et al. |
| 6,417,121 B1 | 7/2002 | Newkirk et al. |
| 6,417,122 B1 | 7/2002 | Newkirk et al. |
| 6,420,285 B1 | 7/2002 | Newkirk et al. |
| 6,443,940 B1 | 9/2002 | Ashton et al. |
| 6,444,774 B1 | 9/2002 | Stahl et al. |
| 6,458,726 B1 | 10/2002 | Harrington et al. |
| 6,465,073 B1 | 10/2002 | Morman et al. |
| 6,465,378 B2 | 10/2002 | Gessner et al. |
| 6,476,289 B1 | 11/2002 | Buell et al. |
| 6,478,785 B1 | 11/2002 | Ashton et al. |
| 6,482,896 B2 | 11/2002 | Maugans et al. |
| 6,503,853 B1 | 1/2003 | Kassner et al. |
| 6,506,695 B2 | 1/2003 | Gardner et al. |
| 6,506,698 B1 | 1/2003 | Quantrille et al. |
| 6,516,472 B2 | 2/2003 | Gessner et al. |
| 6,525,157 B2 | 2/2003 | Cozewith et al. |
| 6,559,262 B1 | 5/2003 | Waymouth et al. |
| 6,569,945 B2 | 5/2003 | Bugada et al. |
| 6,572,598 B1 | 6/2003 | Ashton et al. |
| 6,579,274 B1 | 6/2003 | Morman et al. |
| 6,582,414 B1 | 6/2003 | Richardson |
| 6,586,354 B1 | 7/2003 | Topolkaraev et al. |
| 6,589,892 B1 | 7/2003 | Smith et al. |
| 6,610,039 B1 | 8/2003 | Wilhelm et al. |
| 6,627,564 B1 | 9/2003 | Morman et al. |
| 6,632,212 B1 | 10/2003 | Morman et al. |
| 6,649,546 B2 | 11/2003 | Ohata |
| 6,649,547 B1 | 11/2003 | Arnold et al. |
| 6,676,883 B2 | 1/2004 | Hutchinson et al. |
| 6,717,028 B1 | 4/2004 | Oberstadt |
| 6,777,056 B1* | 8/2004 | Boggs et al. ............ 428/58 |
| 6,777,082 B2 | 8/2004 | Patel et al. |
| 6,780,272 B2 | 8/2004 | Wood |
| 6,881,793 B2 | 4/2005 | Sheldon et al. |
| 6,881,800 B2 | 4/2005 | Friedersdorf |
| 6,887,941 B2 | 5/2005 | Zhou |
| 6,902,796 B2 | 6/2005 | Morell et al. |
| 6,906,160 B2 | 6/2005 | Stevens et al. |
| 6,909,028 B1 | 6/2005 | Shawver et al. |
| 6,914,018 B1 | 7/2005 | Uitenbroek et al. |
| 6,927,184 B1 | 8/2005 | Jacobs-Hartwig et al. |
| 6,939,591 B2 | 9/2005 | Hutchinson et al. |
| 6,946,413 B2 | 9/2005 | Lange et al. |
| 6,960,635 B2 | 11/2005 | Stevens et al. |
| 6,982,231 B1 | 1/2006 | Uitenbroek et al. |
| 6,989,125 B2 | 1/2006 | Boney et al. |
| 6,992,158 B2 | 1/2006 | Datta et al. |
| 6,994,763 B2 | 2/2006 | Austin |
| 7,019,081 B2 | 3/2006 | Datta et al. |
| 7,022,632 B2 | 4/2006 | Hatta et al. |
| 7,026,404 B2 | 4/2006 | Cozewith et al. |
| 7,078,089 B2 | 7/2006 | Ellis et al. |
| 7,101,622 B2 | 9/2006 | Chang et al. |
| 7,101,623 B2 | 9/2006 | Jordan et al. |
| 7,199,203 B2 | 4/2007 | Stevens et al. |
| 7,261,551 B2 | 8/2007 | Hutchinson et al. |
| 7,300,895 B2 | 11/2007 | Kobayashi et al. |
| 7,318,961 B2 | 1/2008 | Loos et al. |
| 7,319,077 B2 | 1/2008 | Mehta et al. |
| 7,320,948 B2 | 1/2008 | Morman et al. |
| 7,329,621 B2 | 2/2008 | Collier, IV et al. |
| 7,332,204 B2 | 2/2008 | Hutchinson et al. |
| 7,335,273 B2 | 2/2008 | Neculescu et al. |
| 7,344,775 B2 | 3/2008 | Stevens et al. |
| 7,355,089 B2 | 4/2008 | Chang et al. |
| 7,355,091 B2 | 4/2008 | Kellenberger et al. |
| 7,404,811 B2 | 7/2008 | Ohnishi et al. |
| 7,405,171 B2 | 7/2008 | Tsujiyama et al. |
| 7,405,172 B2 | 7/2008 | Shigematsu et al. |
| 7,413,803 B2 | 8/2008 | Jordan et al. |
| 7,425,517 B2 | 9/2008 | Deka et al. |
| 7,438,777 B2 | 10/2008 | Pourdeyhimi et al. |
| 7,439,301 B2 | 10/2008 | Handlin, Jr. |
| 7,445,831 B2 | 11/2008 | Ashraf et al. |
| 7,445,838 B2 | 11/2008 | Quinn |
| 7,452,832 B2 | 11/2008 | Bansal et al. |
| 7,462,573 B2 | 12/2008 | Tsujiyama et al. |
| 7,476,447 B2 | 1/2009 | Thomas |
| 7,491,666 B2 | 2/2009 | Smith et al. |
| 7,494,709 B2 | 2/2009 | Davis |
| 7,494,947 B2 | 2/2009 | Boscolo |
| 7,501,034 B2 | 3/2009 | Ashraf |
| 7,601,666 B2 | 10/2009 | Rix et al. |
| 7,795,366 B2 | 9/2010 | Yang et al. |
| 2002/0019507 A1 | 2/2002 | Karandinos et al. |
| 2002/0055316 A1 | 5/2002 | Araida et al. |
| 2003/0125696 A1 | 7/2003 | Morman et al. |
| 2003/0194939 A1 | 10/2003 | Schwarz |
| 2004/0110442 A1 | 6/2004 | Rhim et al. |
| 2004/0121687 A1 | 6/2004 | Morman et al. |
| 2004/0209540 A1 | 10/2004 | Schwarz |
| 2004/0236042 A1 | 11/2004 | Datta et al. |
| 2005/0027080 A1 | 2/2005 | Bodiford et al. |
| 2005/0106978 A1 | 5/2005 | Cheng et al. |
| 2005/0130544 A1 | 6/2005 | Cheng et al. |
| 2005/0148263 A1 | 7/2005 | Zhou et al. |
| 2005/0170729 A1 | 8/2005 | Stadelman et al. |
| 2006/0003658 A1 | 1/2006 | Hall et al. |
| 2006/0135923 A1 | 6/2006 | Boggs et al. |
| 2006/0141886 A1 | 6/2006 | Brock et al. |
| 2006/0151914 A1 | 7/2006 | Gerndt et al. |
| 2006/0172647 A1 | 8/2006 | Mehta et al. |
| 2006/0173123 A1 | 8/2006 | Yang et al. |
| 2006/0199006 A1 | 9/2006 | Poon et al. |
| 2006/0210746 A1 | 9/2006 | Shi et al. |
| 2006/0270303 A1 | 11/2006 | Berrigan et al. |
| 2007/0017075 A1 | 1/2007 | Nguyen |
| 2007/0078222 A1 | 4/2007 | Chang et al. |
| 2007/0092704 A1 | 4/2007 | Patel et al. |
| 2007/0123131 A1 | 5/2007 | Nguyen et al. |
| 2007/0135785 A1 | 6/2007 | Qin et al. |
| 2007/0141937 A1 | 6/2007 | Hendrix et al. |
| 2007/0161747 A1 | 7/2007 | Maier et al. |
| 2007/0173162 A1 | 7/2007 | Ethiopia et al. |
| 2007/0184256 A1 | 8/2007 | Okada et al. |
| 2007/0197117 A1 | 8/2007 | Austin et al. |
| 2007/0202330 A1 | 8/2007 | Peng et al. |

(56) References Cited

U.S. PATENT DOCUMENTS

| | | |
|---|---|---|
| 2007/0203301 A1 | 8/2007 | Autran et al. |
| 2007/0203469 A1 | 8/2007 | Ohnishi et al. |
| 2007/0254545 A1 | 11/2007 | Martin |
| 2007/0287348 A1 | 12/2007 | Autran et al. |
| 2008/0003910 A1 | 1/2008 | Hughes et al. |
| 2008/0014819 A1 | 1/2008 | Suzuki et al. |
| 2008/0026660 A1 | 1/2008 | Ogawa et al. |
| 2008/0038982 A1 | 2/2008 | Motomura et al. |
| 2008/0045917 A1 | 2/2008 | Autran et al. |
| 2008/0061476 A1 | 3/2008 | Hutchinson et al. |
| 2008/0076315 A1 | 3/2008 | McCormack et al. |
| 2008/0119102 A1 | 5/2008 | Hughes et al. |
| 2008/0132135 A1 | 6/2008 | Collias et al. |
| 2008/0132862 A1 | 6/2008 | Collias et al. |
| 2008/0132866 A1 | 6/2008 | Siqueira et al. |
| 2008/0160859 A1 | 7/2008 | Gupta et al. |
| 2008/0160862 A1 | 7/2008 | Sartori et al. |
| 2008/0161765 A1 | 7/2008 | Morman et al. |
| 2008/0172840 A1 | 7/2008 | Kacker et al. |
| 2008/0177242 A1 | 7/2008 | Chang et al. |
| 2008/0182116 A1 | 7/2008 | Dharmarajan et al. |
| 2008/0182468 A1 | 7/2008 | Dharmarajan et al. |
| 2008/0182473 A1 | 7/2008 | Chen et al. |
| 2008/0182940 A1 | 7/2008 | Dharmarajan et al. |
| 2008/0199673 A1 | 8/2008 | Allgeuer et al. |
| 2008/0207071 A1 | 8/2008 | Muslet et al. |
| 2008/0220273 A1 | 9/2008 | Weaver |
| 2008/0221540 A1 | 9/2008 | Thomas et al. |
| 2008/0233819 A1 | 9/2008 | Tsujiyama et al. |
| 2008/0233824 A1 | 9/2008 | Abed et al. |
| 2008/0237911 A1 | 10/2008 | Ardiff et al. |
| 2008/0241447 A1 | 10/2008 | Shi |
| 2008/0251492 A1 | 10/2008 | Shi |
| 2008/0287027 A1 | 11/2008 | Suzuki et al. |
| 2008/0299857 A1 | 12/2008 | Harding et al. |
| 2008/0300567 A1 | 12/2008 | Ohnishi et al. |
| 2008/0311815 A1 | 12/2008 | Gupta et al. |
| 2009/0068419 A1 | 3/2009 | Pascavage |
| 2009/0068420 A1 | 3/2009 | Pascavage |
| 2009/0124153 A1 | 5/2009 | Dharmarajan et al. |
| 2009/0124154 A1 | 5/2009 | Harrington et al. |
| 2010/0081352 A1 | 4/2010 | Westwood |
| 2010/0124864 A1 | 5/2010 | Dharmarajan et al. |
| 2010/0222755 A1 | 9/2010 | Westwood |
| 2010/0222761 A1 | 9/2010 | Westwood et al. |
| 2010/0266818 A1 | 10/2010 | Westwood et al. |
| 2010/0267914 A1 | 10/2010 | Westwood et al. |

FOREIGN PATENT DOCUMENTS

| | | |
|---|---|---|
| EP | 0 277 003 | 8/1988 |
| EP | 0 277 004 | 8/1988 |
| EP | 0 426 637 | 5/1991 |
| EP | 0 432 755 | 6/1991 |
| EP | 0 495 375 | 7/1992 |
| EP | 0 500 944 | 9/1992 |
| EP | 0 520 732 | 12/1992 |
| EP | 0 534 863 | 3/1993 |
| EP | 0 570 982 | 11/1993 |
| EP | 0 573 403 | 12/1993 |
| EP | 1 066 961 | 1/2001 |
| EP | 1 070 087 | 1/2001 |
| EP | 1 138 472 | 10/2001 |
| EP | 1 174 257 | 1/2002 |
| EP | 1 614 699 | 1/2006 |
| EP | 1 712 351 | 10/2006 |
| EP | 1 834 015 | 9/2007 |
| EP | 1 877 237 | 1/2008 |
| EP | 1 980 390 | 10/2008 |
| JP | 02/105833 | 4/2002 |
| JP | 2005/171456 | 6/2005 |
| JP | 4753852 | 8/2007 |
| WO | WO 91/09882 | 7/1991 |
| WO | WO 92/00333 | 1/1992 |
| WO | WO 92/16361 | 10/1992 |
| WO | WO 92/16366 | 10/1992 |
| WO | WO 94/03506 | 2/1994 |
| WO | WO 94/26816 | 11/1994 |
| WO | WO 98/39384 | 9/1998 |
| WO | WO 00/01745 | 1/2000 |
| WO | WO 00/18994 | 4/2000 |
| WO | WO 00/37723 | 6/2000 |
| WO | WO 00/38911 | 7/2000 |
| WO | WO 01/00915 | 1/2001 |
| WO | WO 01/00917 | 1/2001 |
| WO | WO 02/34511 | 5/2002 |
| WO | WO 02/36651 | 5/2002 |
| WO | WO 03/040201 | 5/2003 |
| WO | WO 2004/038078 | 5/2004 |
| WO | WO 2005/049672 | 6/2005 |
| WO | WO 2006/101631 | 9/2006 |
| WO | WO 2007/030170 | 3/2007 |
| WO | WO 2007/140163 | 12/2007 |
| WO | WO 2007/142736 | 12/2007 |
| WO | WO 2008/094337 | 8/2008 |
| WO | WO 2009/064583 | 5/2009 |
| WO | WO 2009/126712 | 10/2009 |
| WO | WO 2010/001273 | 1/2010 |
| WO | WO 2010/039579 | 4/2010 |
| WO | WO 2010/039583 | 4/2010 |
| WO | WO 2010/098792 | 9/2010 |
| WO | WO 2010/098793 | 9/2010 |
| WO | WO 2011/041575 | 4/2011 |

OTHER PUBLICATIONS

Rooney, J.G. et al., "On Line Determination by Light Scattering of Mechanical Degradation in the GPC Process", Liquid Chromatography of Polymers and Related Materials III, Cazes, J. Ed., Marcel Dekker, pp. 207-234 (1981).

Chapman, R., "Nonwoven Fabrics, Staple Fibers", Kirk-Othmer Encyclopedia of Chemical Technology, John Wiley & Sons, pp. 1-27 (2005).

Cheng, H. N. "$^{13}C$ NMR Analysis of Ethylene-Propylene Rubbers", Macromolecules, vol. 17, pp. 1950-1955 (1984).

Index05 Daily News, Apr. 14, 2005, in association with Nonwovens Report International, pp. 4.

Index08, Geneva Palexpo Apr. 15-18, 2008, Biax-Fiberfilm Corporation.

E. P. Moore, Jr. ed., "9.2.1.1 Melt-Blown Fibers," in Polypropylene Handbook, Polymerization, Charaterization, Properties, Processing, Applications, pp. 314-324, 1996.

Prabhu, P. et al., "Evidence for Ethylene-Propylene Block Copolymer Formation", J. Poly. Sci.: Polymer Letters Ed., vol. 18, pp. 389-394 (1980).

Rudnick, L.R. et al., "Poly(α-olefins)", Synthetic Lubricants and High Performance Functional Fluids, $2^{nd}$ Edition, Marcel Dekker, Inc., pp. 3-52 (1999).

Seyam, A.M. et al., "An Examination of the Hydroentangling Process Variables", in Int'l Nonwovens J., pp. 25-33 (Spring 2005).

Ver Strate, G. et al., "Near Monodisperse Ethylene-Propylene Copolymers by Direct Ziegler-Natta Polymerization. Preparation, Characterization, Properties", Macromolecules, vol. 21, pp. 3360-3371 (1988).

Zhao, R., "Melt Blowing Polyoxymethylene Copolymer", in Int'l Nonwovens J., pp. 19-24 (Summer 2005).

Zhao, R., "Stretching the Value of Melt Blown with Cellulose Microfiber and Elastic Resin," A Paper for Insight 2004, Austin, Texas, USA, Oct. 10-14, 2004, Biax Fiberfilm Corporation, Greenville, Wisconsin, pp. 1-13.

Dharmarajan, N. et al., "Tailoring the Performance of Specialty Polyolefin Elastomer Based Elastic Nonwoven Fabrics", INTC® 2006, International Nonwovens Technical Conference, Conference Proceedings, Houston, TX, United States, Sep. 25-28, 2006.

Dutta, S. et al., "More Efficient Manufacture of Controlled-rheology Polypropylene", Society of Plastics Engineers, Plastics Research Online (2010).

Harrington, B.A. et al., "Processability and Fabric Attributes of Specialty Polyolefin Elastomers", INTC® 2005, International

(56) References Cited

OTHER PUBLICATIONS

Nonwovens Technical Conference, Conference Proceedings, St. Louis, MS, United States, Sep. 19-22, 2005.

Kacker, S. et al., "*Properties of Elastic Nonwoven Fabrics Based Upon Specialty Polyolefin Elastomers*", INTC® 2006, International Nonwovens Technical Conference, Conference Proceedings, Houston, TX, United States, Sep. 25-28, 2006.

Srivatsan, S. et al., "*Novel Polyolefin Resin for Elastic Spunbond & Melt Blown Applications*", INTC® 2004, Toronto, Canada, Sep. 20-23, 2004.

VISTAMAXX™ 2120 Propylene-based Elastomer, data sheets. <URL: www.specialtyelastomers.com>, 2011.

VISTAMAXX™ Specialty Elastomers for Meltblown Fabrics, data sheet. <URL: www.vistamaxxelastomers.com, 2005.

VISTAMAXX™ Specialty Elastomers VM2320, data sheet. <URL: www.vistamaxxelastomers.com, 2005.

VISTAMAXX™ Specialty Elastomers for Spunbond Fabrics, data sheet. URL: www.vistamaxxelastomers.com, 2005.

VISTAMAXX™ Specialty Elastomers—Unlimited Creative Potential. Imagine That! URL: www.vistamaxxelastomers.com, 2005.

Wheeler, L.M. et al., "*Gel Permeation Chromatography/Fourier Transform Infrared Interface for Polymer Analysis*", Applied Spectroscopy, vol. 47, No. 8, pp. 1128-1130 (1993).

\* cited by examiner

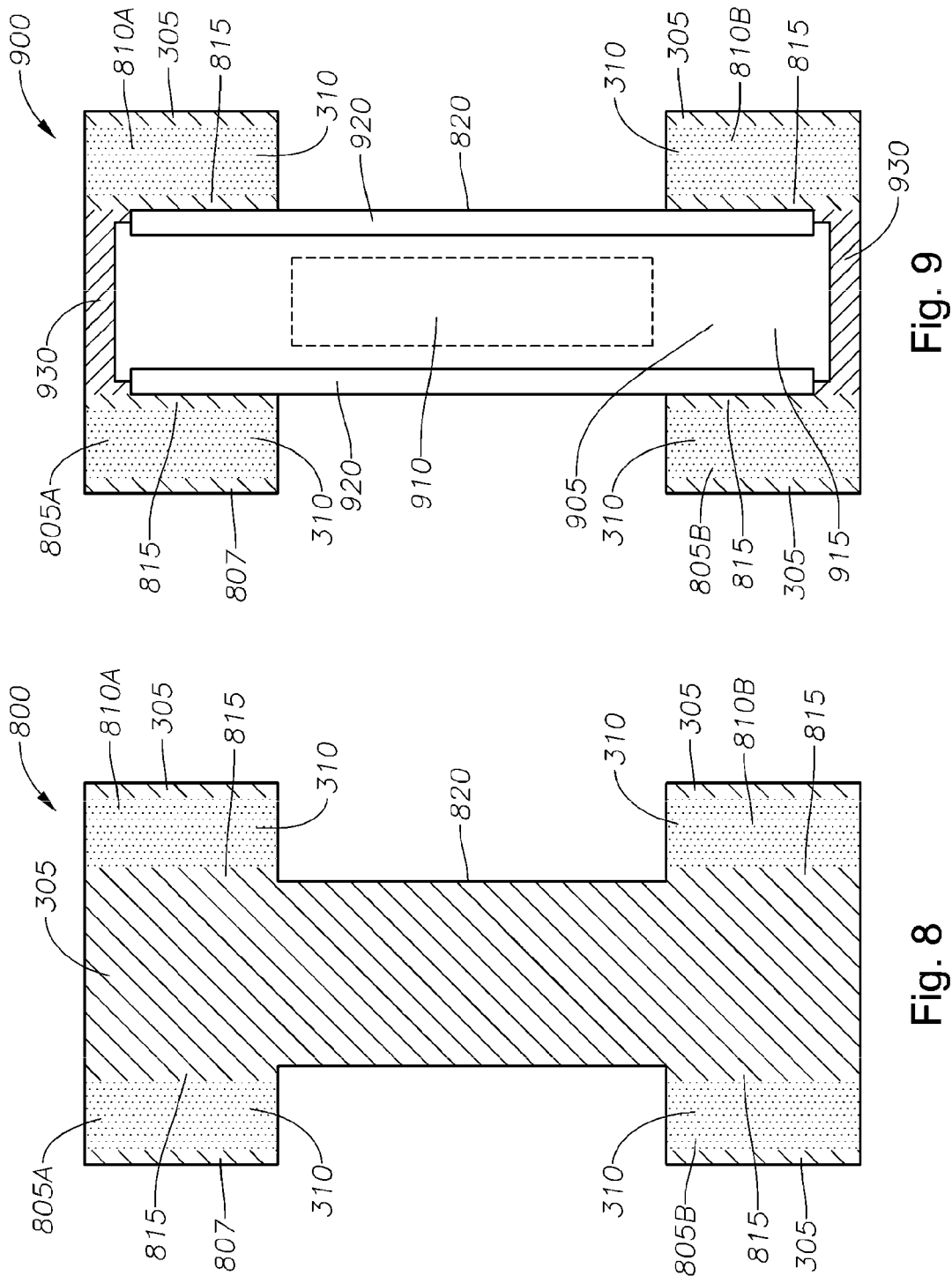

FABRIC WITH DISCRETE ELASTIC AND PLASTIC REGIONS AND METHOD FOR MAKING SAME

CROSS REFERENCE TO RELATED APPLICATIONS

This application claims priority to U.S. Provisional Patent Application No. 61/264,009, filed Nov. 24, 2009, the disclosure of which is incorporated herein by reference in its entirety. This application is related to U.S. Ser. No. 12/271,526, filed Nov. 14, 2008, U.S. Ser. No. 61/101,341, filed Sep. 30, 2008, U.S. Ser. No. 61/157,524, filed Mar. 4, 2009, U.S. Ser. No. 12/566,564, filed Sep. 24, 2009, U.S. Ser. No. 61/156,078, filed Feb. 27, 2009, U.S. Ser. No. 12/566,410, filed Sep. 24, 2009, U.S. Ser. No. 12/566,434, filed Sep. 24, 2009, U.S. Ser. No. 61/248,254, filed Oct. 2, 2009, U.S. Ser. No. 12/894,955, filed Sep. 30, 2010, U.S. Ser. No. 12/723,317, filed Mar. 12, 2010, U.S. Ser. No. 12/723,336, filed Mar. 12, 2010, and U.S. Ser. No. 12/726,642, filed Mar. 18, 2010, all of which are incorporated by reference in their entireties.

FIELD OF THE INVENTION

Embodiments of the present invention generally relate to nonwoven fabrics. More particularly, embodiments of the present invention relate to a method for forming a composite fabric with discrete elastic and plastic regions in the plane of the fabric.

BACKGROUND OF THE INVENTION

The disposable hygiene market continues to demand enhanced fit and comfort for diapers, training pants, adult incontinence and feminine care products. This need has been met through the incorporation of elastic components such as stretch tabs, elastic waist bands, and larger area elastic ears/wings and side panels. Such elastic components are expensive, which limits the ability of diaper designers to make the next generational improvement in diaper design, or that of the all around stretch diaper or absorbent hygiene product. Current designs also require such elastic components to be attached, which adds to the manufacturing complexity and thus cost of the diaper line.

Elastic diaper chassis have been developed based on nonwoven or elastic films. An important consideration is the need to have elastic or extensible performance in only those regions that require their performance. Otherwise, expensive elastomeric products are used in areas where a much cheaper PP material could be used.

Some related disclosures include EP 1 712 351 A, U.S. Pat. No. 4,380,570, U.S. Pat. No. 5,476,616, U.S. Pat. No. 5,804,286, U.S. Pat. No. 5,921,973, U.S. Pat. No. 6,080,818, U.S. Pat. No. 6,342,565, U.S. Pat. No. 6,417,121, U.S. Pat. No. 6,444,774, U.S. Pat. No. 6,506,698, U.S. Pat. No. 7,026,404, U.S. Pat. No. 7,101,622, US 2003/0125696, US 2005/0106978, US 2006/0172647, U.S. Pat. No. 6,342,565, US 2005/0106978, US 2005/0130544, US 2006/0172647, US 2008/0182116, US 2008/0182940, US 2008/0182468, U.S. Ser. No. 11/655,399, and R. Zhao, "Melt Blowing Polyoxymethylene Copolymer" in INT'L NONWOVENS J., 19-24 (Summer 2005).

There is still a need, therefore, for a commercially feasible composite fabric made of both inelastic and elastic components and methods for making same.

SUMMARY OF THE INVENTION

An in situ compositionally modulated meltspun fabric and method for making the same are provided. In at least one specific embodiment, the meltspun fabric has at least one layer comprising a plurality of discrete regions of fiber. At least two discrete regions of fiber are inelastic or extensible and at least one discrete region of fiber is elastic or extensible. The layer is compositionally modulated in the cross direction.

In at least one other specific embodiment, the meltspun fabric has at least one layer comprising a plurality of discrete regions of fiber. At least two discrete regions of fiber are inelastic or extensible and at least one discrete region of fiber is elastic or extensible. The layer is compositionally modulated in the cross direction. The meltspun fabric also has at least one facing layer disposed on the layer comprising the plurality of discrete regions of fiber, wherein the facing layer consists essentially of one or more inelastic resins or one or more extensible resins.

In at least one other specific embodiment, the meltspun fabric has a first layer comprising a plurality of discrete regions of fiber, wherein at least two discrete regions of fiber are inelastic or extensible and at least one discrete region of fiber is elastic or extensible. The meltspun fabric also has a second layer comprising a plurality of discrete regions of fiber, wherein at least two discrete regions of fiber are inelastic or extensible and at least one discrete region of fiber is elastic or extensible. The first and second layers are each compositionally modulated in the cross direction.

In at least one specific embodiment, the method for forming an in situ meltspun fabric, comprises extruding one or more elastic or extensible resins through a die having a plurality of nozzles to form a first plurality of continuous fibers; extruding one or more inelastic or extensible resins through the die simultaneously or nearly simultaneously with the one or more elastic resins to form a second plurality of continuous fibers, wherein: the plurality of nozzles are separated into at least a first set of discrete zones and at least a second set of discrete zones, and the first set of discrete zones are used to extrude the one or more elastic or extensible resins and the second set of discrete zones are used to extrude the one or more inelastic or extensible resins.

So that the recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

BRIEF DESCRIPTION OF THE DRAWINGS

FIG. 8 depicts a schematic view of an illustrative integrated backsheet for a diaper, according to one or more embodiments.

FIG. 9 depicts a schematic view of an illustrative assembled diaper, according to one or more embodiments.

DETAILED DESCRIPTION

Figure 1:
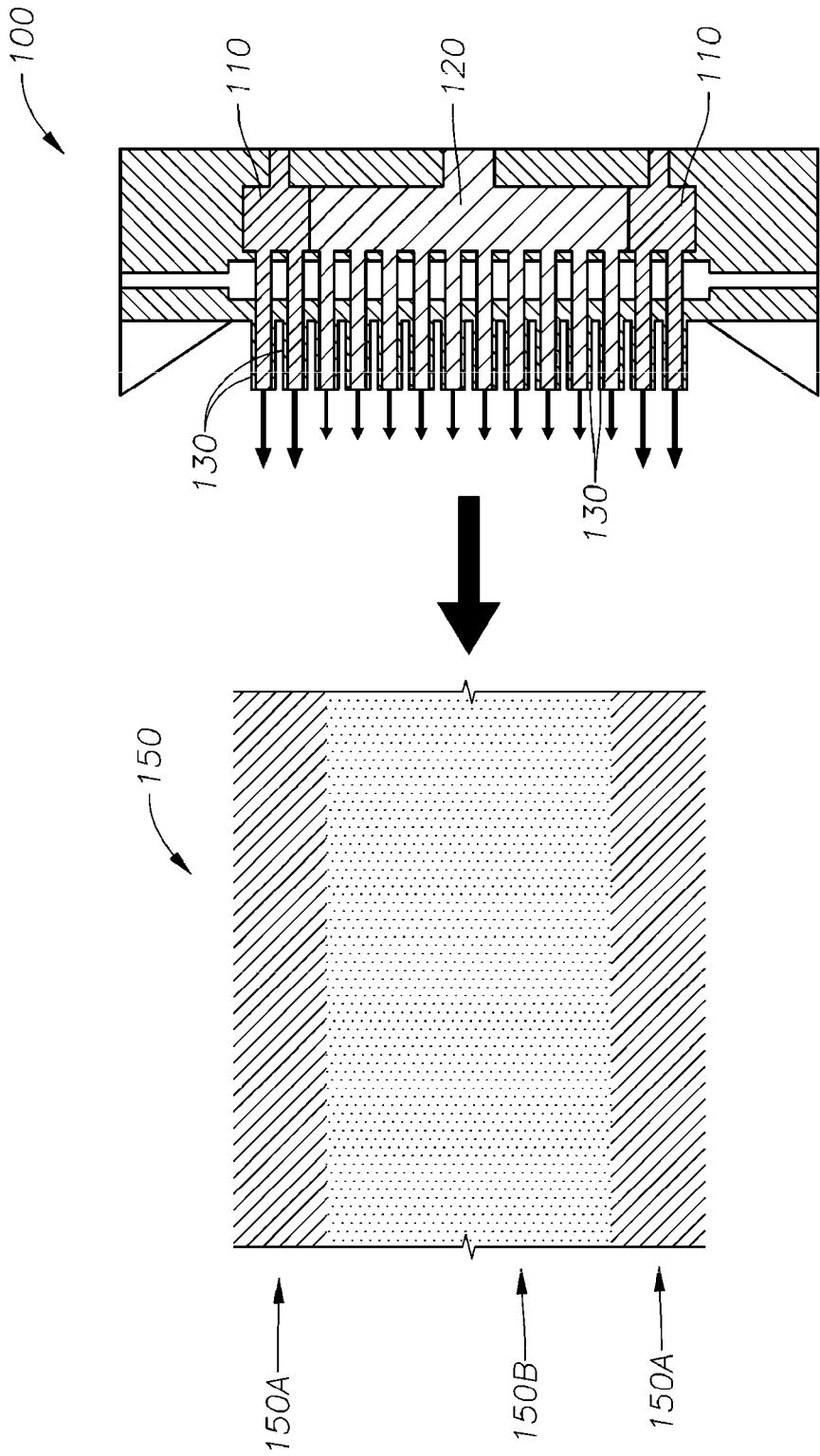
FIG. 1 depicts an illustrative cross-sectional view of a meltspinning array die capable of producing an ICMMF, according to one or more embodiments.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

As used herein, an "in situ compositionally modulated meltspun fabric" (or "ICMMF") refers to a structure that has at least one fabric layer made by an in situ meltspinning process and that has at least two discrete regions of fiber that are compositionally modulated. By "compositionally modulated," it is meant that the polymer type and/or polymer composition of any two adjoining discrete fiber regions differ.

A "composite" refers to a structure that comprises two or more ICMMFs, or at least one ICMMF and at least one other layer of material such as a film, another fabric made from any suitable material. The composite may be made, for example, by sequentially depositing onto a moving forming belt first a meltspun fabric layer, then depositing another meltspun fabric layer or adding a carded or dry-laid fabric on top of the first meltspun fabric layer, then adding a meltspun fabric layer on top of those layers, followed by some bonding of the various layered materials, such as by thermal point bonding or the intrinsic tendency of the layers to adhere to one another, hydroentangling, etc. Alternatively, the fabric layers may be made individually, collected in rolls, and combined in a separate bonding step or steps. The ICMMFs and composites may also have various numbers of layers in many different configurations and may include other materials like films, adhesives, textile materials, absorbent materials, (e.g., pulp, paper, SAP etc), coform materials, meltblown and spunbond materials, or air-laid materials, etc.

As used herein, materials, resins, fibers, and/or fabrics referred to as being "elastic" are those that can recover at least 70% after 100% deformation.

As used herein, materials, resins, fibers, and/or fabrics referred to as being "extensible" are those that can recover 20% to 70% after 100% deformation, as determined by ASTM D412. Extensible materials and fabrics are well known in the art and are those formed, in one instance, from a material that is extensible or by mechanically distorting or twisting a fabric (natural or synthetic) such as described in U.S. Pat. No. 5,523,141.

As used herein, materials, resins, fibers, and/or fabrics referred to as being "inelastic" are those that can recover less than 20% after 100% deformation.

The individual discrete zones or regions that make up the ICMMF can be the same or different. More particularly, the individual discrete zones or regions can have the same or different chemical and/or physical characteristics. For example, each discrete region can be characterized in that: (a) the basis weight of the region is the same or different, (b) the thickness of each region is the same or different, (c) the average diameter of the fibers making up each region is the same or different, (d) the composition of the fibers in each region is the same or different, (e) the number density of fibers per unit area in each region is the same or different, (f) the cross-sectional shape of the fibers in each region is the same or different, (g) the individual fiber structure in each region is the same or different (bicomponent versus mono-component), (h) the cross-sectional morphology of the fibers in adjacent regions is the same or different, or (i) any combination thereof.

Adjoining discrete regions can be attached to one another through fiber entanglement, adhesion, thermal mechanism, or any combination thereof. For example, any two adjacent discrete regions can be entangled to a degree that prevents the regions from easily being pulled apart. In certain embodiments, the adjacent regions have a Peel Strength of greater than 10 or 20 or 30 or 40 or 50 grams, or in other embodiments within the range from 1 or 2 or 5 or 10 to 50 or 60 or 80 or 100 or 120 or 150 or 200 grams. Peel Strength referred to herein can be determined in accordance with ASTM D2724.13.

Suitable resins can be or include cellulosics, nylons, polyacetals, polyalkylene naphthalates, polyesters, co-polyesters, polyurethane, polyamids, polyamides, polyolefins, polyolefin homopolymers, polyolefin copolymers, acrylic, and blends thereof. Except as stated otherwise, the term "copolymer" means a polymer derived from two or more monomers (including terpolymers, tetrapolymers, etc. that can be arranged in a random, block, or grafted distribution), and the term "polymer" refers to any carbon-containing compound having repeat units from one or more different monomers.

Preferred cellulosic materials include rayon and viscose. A preferred polyacetal is polyoxymethylene copolymer. Preferred polyesters include polyolefin-terephthalates and polyalkylene terephthalates, such as poly(ethylene terephthalate) (PET), poly(butylene terephthalate) (PBT), and poly(cyclohexane dimethylene terephthalate) (PCT).

Preferred polyolefins can be prepared from mono-olefin monomers including, but not limited to, monomers having 2 to 8 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Other suitable polyolefins can include one or more propylene homopolymers (100 wt % propylene-derived units), propylene copolymers, propylene-α-olefin copolymers, polypropylene impact copolymers (ICP), random copolymers (RCP) linear low density polyethylene, high density polyethylene, low density polyethylene, ethylene block copolymers (e.g., Infuse™ olefin block copolymers), styrenic block copolymers (e.g., Kraton™ styrenic copolymers), ethylene vinylacetates, urethanes, polyesters, and blends thereof. Certain specific extensible resins can include polyacrylonitrile, polybutylene terephthalate, polyethylene terephthalate (PET), polycyclohexylenedimethylene terephthalate (PCT), polyamide and/or acrylic, RCPs, ICPs or blends of polypropylene and propylene-ethylene copolymers.

As used herein, "polypropylene" refers to a propylene homopolymer, or a copolymer of propylene, or some mixture of propylene homopolymers and copolymers. In certain embodiments, the polypropylene described herein is predominately crystalline, thus the polypropylene may have a melting point ($T_m$) greater than 110° C. or 115° C. or 130° C. The term "crystalline," as used herein, characterizes those polymers which possess high degrees of inter- and intra-molecular order. In certain embodiments the polypropylene has a heat of fusion ($H_f$) greater than 60 J/g or 70 J/g or 80 J/g, as determined by DSC analysis. The heat of fusion is dependent on the composition of the polypropylene; the thermal energy for the highest order of polypropylene is estimated at 189 J/g that is, 100% crystallinity is equal to a heat of fusion of 189 J/g. A polypropylene homopolymer will have a higher heat of fusion than a copolymer or blend of homopolymer and copolymer.

In certain embodiments, the polypropylene(s) can be isotactic. Isotacticity of the propylene sequences in the polypropylenes can be achieved by polymerization with the choice of a desirable catalyst composition. The isotacticity of the polypropylenes as measured by $^{13}C$ NMR, and expressed as a meso diad content is greater than 90% (meso diads [m]>0.90) or 95% or 97% or 98% in certain embodiments, determined as in U.S. Pat. No. 4,950,720 by $^{13}C$ NMR. Expressed another way, the isotacticity of the polypropylenes as measured by $^{13}C$ NMR, and expressed as a pentad content, is greater than 93% or 95% or 97% in certain embodiments.

The polypropylene can vary widely in composition. For example, substantially isotactic polypropylene homopolymer or propylene copolymer containing equal to or less than 10 wt % of other monomer, that is, at least 90 wt % by weight propylene can be used. Further, the polypropylene can be present in the form of a graft or block copolymer, in which the blocks of polypropylene have substantially the same stereo-regularity as the propylene-α-olefin copolymer (described below) so long as the graft or block copolymer has a sharp melting point above 110° C. or 115° C. or 130° C., characteristic of the stereoregular propylene sequences.

The polypropylene can be a combination of homopolypropylene, and/or random, and/or block copolymers as described herein. When the polypropylene is a random copolymer, the percentage of the α-olefin derived units in the copolymer is, in general, up to 5% by weight of the polypropylene, 0.5% to 5% by weight in another embodiment, and 1% to 4% by weight in yet another embodiment. The preferred comonomer derived from ethylene or α-olefins containing 4 to 12 carbon atoms. One, two or more comonomers can be copolymerized with propylene. Exemplary α-olefins may be selected from the group consisting of ethylene; 1-butene; 1-pentene-2-methyl-1-pentene-3-methyl-1-butene; 1-hexene-3-methyl-1-pentene-4-methyl-1-pentene-3,3-dimethyl-1-butene; 1-heptene; 1-hexene; 1-methyl-1-hexene; dimethyl-1-pentene; trimethyl-1-butene; ethyl-1-pentene; 1-octene; methyl-1-pentene; dimethyl-1-hexene; trimethyl-1-pentene; ethyl-1-hexene; 1-methylethyl-1-pentene; 1-diethyl-1-butene; propyl-1-pentene; 1-decene; methyl-1-nonene; 1-nonene; dimethyl-1-octene; trimethyl-1-heptene; ethyl-1-octene; methylethyl-1-butene; diethyl-1-hexene; 1-dodecene and 1-hexadodecene.

The weight average molecular weight (Mw) of the polypropylene can be between 50,000 g/mol to 3,000,000 g/mol, or from 90,000 g/mol to 500,000 g/mol in another embodiment, with a molecular weight distribution (MWD, Mw/Mn) within the range from 1.5 to 2.5; or 3.0 to 4.0; or 5.0 to 20.0. The polypropylene can have an MFR (2.16 kg/230° C.) ranging of from 1 dg/min to 10 dg/min; or 18 dg/min to 30 dg/min; or 35 dg/min to 45 dg/min; or 40 dg/min to 50 dg/min.

The term "random polypropylene" ("RCP") as used herein broadly means a single phase copolymer of propylene having up to 9 wt %, preferably 2 wt % to 8 wt % of an alpha olefin comonomer. Preferred alpha olefin comonomers have 2 carbon atoms, or from 4 to 12 carbon atoms. Preferably, the alpha olefin comonomer is ethylene.

The propylene impact copolymer ("ICP") is heterogeneous and can include a first phase of 70 to 95 wt % homopolypropylene and a second phase of from 5 to 30 wt % ethylene-propylene rubber, based on the total weight of the impact copolymer. The propylene impact copolymer can include 78 to 95 wt % homopolypropylene and from 5 to 22 wt % ethylene-propylene rubber, based on the total weight of the impact copolymer. In certain embodiments, the propylene-based polymer can include from 90 to 95 wt % homopolypropylene and from 5 to 10 wt % ethylene-propylene rubber, based on the total weight of the impact copolymer.

There is no particular limitation on the method for preparing the polypropylenes described herein. However, for example, the polymer is a propylene homopolymer obtained by homopolymerization of propylene in a single stage or multiple stage reactor. Copolymers may be obtained by copolymerizing propylene and ethylene or an α-olefin having from 4 to 20 carbon atoms in a single stage or multiple stage reactor. Polymerization methods include, but are not limited to, high pressure, slurry, gas, bulk, or solution phase, or a combination thereof, using any suitable catalyst such as traditional Ziegler-Natta catalyst or a single-site, metallocene catalyst system, or combinations thereof including bimetallic (i.e, Ziegler-Natta and metallocene) supported catalyst systems.

Exemplary commercial polypropylenes include Exxon-Mobil Polypropylene PP3155 as well as the family of Achieve™ polymers (ExxonMobil Chemical Company, Baytown, Tex.). The Achieve polymers are produced using metallocene catalyst systems. In certain embodiments, the metallocene catalyst system produces a narrow molecular weight distribution polymer. The MWD is typically in the range of 1.5 to 2.5. However, a broader MWD polymer may be produced in a process with multiple reactors. Different MW polymers can be produced in each reactor to broaden the MWD. Achieve polymer such as Achieve 3854, a homopolymer having an MFR of 24 dg/min can be used as a blend component described herein. Alternatively, an Achieve polymer such as Achieve 6936G1, a 1550 dg/min MFR homopolymer, can be used as a blend component described herein. Other polypropylene random copolymer and impact copolymer may also be used. The choice of polypropylene MFR can be used as means of adjusting the final MFR of the blend, especially the facing layer composition. Any of the polypropylenes described herein can be modified by controlled rheology to improve spinning performance as is known in the art.

The "propylene-α-olefin copolymer" is a copolymer of propylene-derived units and one or more units derived from ethylene or a $C_4$-$C_{10}$ α-olefin and optionally one or more diene-derived units, and are relatively elastic and/or form nonwoven fibers and fabrics that are elastic (Ultimate Elongation from greater than 200%). The overall comonomer content of the copolymer is within the range from 5 to 35 wt % in one embodiment. In some embodiments, where more than one comonomer is present, the amount of a particular comonomer may be less than 5 wt %, but the combined comonomer content is from greater than 5 wt %. The propylene-α-olefin copolymers may be described by any number of different parameters, and those parameters may include a numerical range made up of any desirable upper limit with any desirable lower limit as described herein for the propylene-α-olefin copolymers.

The propylene-α-olefin copolymer may be a terpolymer of propylene, block copolymer (the comonomer-derived units occur along long sequences), impact copolymer of propylene, random polypropylene, random copolymer (the comonomer-derived units are randomly distributed along the polymer backbone), or mixtures thereof. The presence of randomness or "blocky-ness" in a copolymer can be determined by $^{13}$C NMR as is known in the art and described in, for example, 18 J. Poly. Sci.: Poly. Lett. Ed., pp. 389-394 (1980).

In certain embodiments, the propylene-α-olefin copolymer can include ethylene or $C_4$-$C_{10}$ α-olefin-derived units (or "comonomer-derived units") within the range from 5 or 7 or 8 or 10 to 18 or 20 or 25 or 32 or 35 wt % by weight of the copolymer. The propylene-α-olefin copolymer may also include two different comonomer-derived units. Also, these copolymers and terpolymers may include diene-derived units as described below. In a particular embodiment, the propylene-α-olefin copolymer includes propylene-derived units and comonomer units selected from ethylene, 1-butene, 1-hexene, and 1-octene. And in a more particular embodiment, the comonomer is ethylene, and thus the propylene-α-olefin copolymer is a propylene-ethylene copolymer.

In one embodiment, the propylene-α-olefin copolymer includes from less than 10 or 8 or 5 or 3 wt %, by weight of the copolymer, of diene derived units (or "diene"), and within the range from 0.1 or 0.5 or 1 to 5 or 8 or 10 wt % in yet another embodiment. Suitable dienes include for example: 1,4-hexadiene, 1,6-octadiene, 5-methyl-1,4-hexadiene, 3,7-dimethyl-1,6-octadiene, dicyclopentadiene (DCPD), ethylidiene norbornene (ENB), norbornadiene, 5-vinyl-2-norbornene (VNB), and combinations thereof. The diene, if present, is most preferably ENB.

In certain embodiments, the propylene-α-olefin copolymers have a triad tacticity of three propylene units, as measured by $^{13}$C NMR, from greater than 75% or 80% or 82% or 85% or 90%. In one embodiment, the triad tacticity is within the range from 50 to 99%, and from 60 to 99% in another embodiment, and from 75 to 99% in yet another embodiment, and from 80 to 99% in yet another embodiment; and from 60 to 97% in yet another embodiment. Triad tacticity is determined as follows: The tacticity index, expressed herein as "m/r", is determined by $^{13}$C NMR. The tacticity index m/r is calculated as defined by H. N. Cheng in 17 MACROMOLECULES, pp. 1950-1955 (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios from greater than 50. Embodiments of the propylene-α-olefin copolymer have a tacticity index m/r within the range from 4 or 6 to 8 or 10 or 12.

In certain embodiments, the propylene-α-olefin copolymers have a heat of fusion ($H_f$), determined according to the Differential Scanning calorimetry (DSC) procedure described herein, within the range from 0.5 or 1 or 5 J/g, to 35 or 40 or 50 or 65 or 75 J/g. In certain embodiments, the $H_f$ value is from less than 75 or 65 or 55 J/g.

In certain embodiments, the propylene-α-olefin copolymers have a percent crystallinity within the range from 0.5 to 40%, and from 1 to 30% in another embodiment, and from 5 to 25% in yet another embodiment, wherein "percent crystallinity" is determined according to the DSC procedure described herein. (The thermal energy for the highest order of polypropylene is estimated at 189 J/g (i.e., 100% crystallinity is equal to 189 J/g.)) In another embodiment, the propylene-α-olefin copolymer has a percent crystallinity from less than 40% or 25% or 22% or 20%.

In certain embodiments, the propylene-α-olefin copolymers have a single peak melting transition as determined by DSC; in certain embodiments the propylene-α-olefin copolymer has a primary peak melting transition from less than 90° C., with a broad end-of-melt transition from greater than about 110° C. The peak "melting point" ($T_m$) is defined as the temperature of the greatest heat absorption within the range of melting of the sample. However, the propylene-α-olefin copolymer may show secondary melting peaks adjacent to the principal peak, and/or the end-of-melt transition, but for purposes herein, such secondary melting peaks are considered together as a single melting point, with the highest of these peaks being considered the $T_m$ of the propylene-α-olefin copolymer. The propylene-α-olefin copolymers have a peak melting temperature ($T_m$) from less than 70° C. or 80° C. or 90° C. or 100° C. or 105° C. in certain embodiments; and within the range from 10° C. or 15° C. or 20° C. or 25° C. to 65° C. or 75° C. or 80° C. or 95° C. or 105° C. in other embodiments.

The procedure for DSC determinations is as follows. about 0.5 grams of polymer is weighed out and pressed to a thickness of about 15-20 mils (about 381-508 microns) at about 140° C.-150° C., using a "DSC mold" and Mylar™ as a backing sheet. The pressed pad is allowed to cool to ambient temperature by hanging in air (the Mylar was not removed). The pressed pad is annealed at room temperature (about 23° C.-25° C.) for about 8 days. At the end of this period, an about 15-20 mg disc is removed from the pressed pad using a punch die and placed in a 10 microliter aluminum sample pan. The sample is placed in a differential scanning calorimeter (Perkin Elmer Pyris 1 Thermal Analysis System) and cooled to about −100° C. The sample is heated at about 10° C./min to attain a final temperature of about 165° C. The thermal output, recorded as the area under the melting peak of the sample, is a measure of the heat of fusion and can be expressed in Joules per gram (J/g) of polymer and automatically calculated by the Perkin Elmer System. Under these conditions, the melting profile shows two (2) maxima, the maxima at the highest temperature was taken as the melting point within the range of melting of the sample relative to a baseline measurement for the increasing heat capacity of the polymer as a function of temperature.

In certain embodiments, the propylene-α-olefin copolymers have a density within the range from 0.840 g/cm$^3$ to 0.920 g/cm$^3$, and from 0.845 g/cm$^3$ to 0.900 g/cm$^3$ in another embodiment, and from 0.850 g/cm$^3$ to 0.890 g/cm$^3$ in yet another embodiment, the values measured at room temperature per the ASTM D-1505 test method.

In certain embodiments, the propylene-α-olefin copolymers have a Shore A hardness (ASTM D2240) within the range from 10 or 20 to 80 or 90 Shore A. In yet another embodiment, the propylene-α-olefin copolymers possess an Ultimate Elongation (ASTM-D412) greater than 500%, 1,000% or 2,000%. The propylene-α-olefin copolymers can also have an Ultimate Elongation (ASTM-D412) ranging from a low of about 300%, 400%, or 500% to a high of about 800%, 1,200%, 1,800%, 2,000%, or 3,000%.

In certain embodiments, the propylene-α-olefin copolymers have a weight average molecular weight (Mw) value within the range from 20,000 to 5,000,000 g/mole, and from 50,000 to 1,000,000 g/mole in another embodiment, and from 70,000 to 400,000 g/mole in yet another embodiment. In another embodiment, the propylene-α-olefin copolymers have a number average molecular weight (Mn) value within the range from 4,500 to 2,500,000 g/mole, and from 20,000 to 250,000 g/mole in yet another embodiment, and from 50,000 to 200,000 g/mole in yet another embodiment. In yet another embodiment, the propylene-α-olefin copolymers have a z-average molecular weight (Mz) value within the range from 20,000 to 7,000,000 g/mole, and from 100,000 to 700,000 g/mole in another embodiment, and from 140,000 to 500,000 g/mole in yet another embodiment.

In certain embodiments, a desirable molecular weight (and hence, a desirable MFR) is achieved by visbreaking the propylene-α-olefin copolymers. The "visbroken propylene-α-olefin copolymers" (also known in the art as "controlled rheology" or "CR") is a copolymer that has been treated with a visbreaking agent such that the agent breaks apart the polymer chains. Non-limiting examples of visbreaking agents include peroxides, hydroxylamine esters, and other oxidizing and free-radical generating agents. Stated another way, the visbroken copolymer may be the reaction product of a visbreaking agent and the copolymer. In particular, a visbroken propylene-α-olefin copolymer is one that has been treated with a visbreaking agent such that its MFR is increased, in one embodiment by at least 10%, and at least 20% in another embodiment relative to the MFR value prior to treatment.

In certain embodiments, the molecular weight distribution (MWD) of the propylene-α-olefin copolymers is within the range from 1.5 or 1.8 or 2.0 to 3.0 or 3.5 or 4.0 or 5.0 or 10.0 in particular embodiments. Techniques for determining the molecular weight (Mn, Mz and Mw) and molecular weight distribution (MWD) are as follows, and as by Ver Strate et al. in 21 MACROMOLECULES, pp. 3360-3371 (1988). Conditions described herein govern over published test conditions. Molecular weight and molecular weight distribution are measured using a Waters 150 gel permeation chromatograph equipped with a Chromatix KMX-6 on-line light scattering photometer. The system was used at 135° C. with 1,2,4-trichlorobenzene as the mobile phase. Showdex™ (Showa-Denko America, Inc.) polystyrene gel columns 802, 803, 804 and 805 are used. This technique is discussed in LIQUID CHROMATOGRAPHY OF POLYMERS AND RELATED MATERIALS III, p. 207 (J. Cazes ed., Marcel Dekker, 1981). No corrections for column spreading were employed; however, data on generally accepted standards, for example, National Bureau of Standards, Polyethylene (SRM 1484) and anionically produced hydrogenated polyisoprenes (an alternating ethylene-propylene copolymer) demonstrate that such corrections on Mw/Mn or Mz/Mw are less than 0.05 units. Mw/Mn was calculated from an elution time-molecular weight relationship whereas Mz/Mw was evaluated using the light scattering photometer. The numerical analyses can be performed using the commercially available computer software GPC2, MOLWT2 available from LDC/Milton Roy-Riviera Beach, Fla.

The propylene-α-olefin copolymers described herein can be produced using any catalyst and/or process known for producing polypropylenes. In certain embodiments, the propylene-α-olefin copolymers can include copolymers prepared according to the procedures in WO 02/36651, U.S. Pat. No. 6,992,158, and/or WO 00/01745. Preferred methods for producing the propylene-α-olefin copolymers are found in US 2004/0236042 and U.S. Pat. No. 6,881,800. Preferred propylene-based polyolefin polymers are available commercially under the trade names VISTAMAXX™ (ExxonMobil Chemical Company, Houston, Tex., USA) and VERSIFY™ (The Dow Chemical Company, Midland, Mich., USA), certain grades of TAFMER™ XM or NOTIO™ (Mitsui Company, Japan), certain grades of LMPO™ (Idemitsu, Japan), or certain grades of SOFTELL™ (Lyondell Basell Polyolefine GmbH, Germany). A commercial example of an ethylene-based polyolefin block copolymer is INFUSE™ olefin block copolymers from Dow Chemical Company.

In one or more embodiments, the meltblown resin can be, or include, natural rubber (NR), synthetic polyisoprene (IR), butyl rubber (copolymer of isobutylene and isoprene, IIR), halogenated butyl rubbers (chloro-butyl rubber (CIIR); bromo-butyl rubber (BIIR)), polybutadiene (BR), styrene-butadiene rubber (SBR), SEBS block copolymers, SIS block copolymers, SBS block copolymers, ethylene-octene block copolymers, ethylene-octene copolymers, ethylene-hexene copolymers, ethylene-butene copolymers, nitrile rubber, hydrogenated nitrile rubbers, chloroprene rubber (CR), polychloroprene, neoprene, EPM (ethylene-propylene rubber) and EPDM rubbers (ethylene-propylene-diene rubber), epichlorohydrin rubber (ECO), polyacrylic rubber (ACM, ABR), silicone rubber, fluorosilicone rubber, fluoroelastomers, perfluoroelastomers, polyether block amides (PEBA), chlorosulfonated polyethylene (CSM), ethylene-vinyl acetate (EVA), thermoplastic elastomers (TPE), thermoplastic vulcanizates (TPV), thermoplastic polyurethane (TPU), thermoplastic olefins (TPO), polysulfide rubber, or blends of any two or more of these elastomers. In at least one specific embodiment, the elastic resin is or includes one or more polyolefin polymers. The term "polyolefin polymers" refers to homopolymers or copolymers of α-olefins having less than 40% crystallinity, or a heat of fusion ($H_f$) of less than 75 J/g.

In certain embodiments, the meltblown resin can be, or include, one or more metallocene polyethylenes ("mPE's"), including one or more mPE homopolymers or copolymers. The mPE homopolymers or copolymers may be produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Several commercial products produced with such catalyst/activator combinations are commercially available from ExxonMobil Chemical Company in Baytown, Tex. under the tradenames EXCEED™ or EXACT™. For more information on the methods and catalysts/activators to produce such mPE homopolymers and copolymers see PCT Patent Application Publication Nos. WO 94/26816, WO 92/00333, WO 91/09882, WO 94/03506 and WO 94/03506; EP 277,003, EP 129,368, EP 520,732, EP 426,637, EP 573,403, EP 520,732, EP 495,375, EP 500,944, EP 570,982 and EP 277,004; U.S. Pat. Nos. 5,153,157, 5,198, 401, 5,240,894, 5,324,800, 5,264,405, 5,096,867, 5,507,475, 5,055,438 and 5,017,714; and Canadian Patent No. 1,268, 753.

In certain embodiments, the meltblown resin can be or include one or more termonomers and tetramonomers which may be one or more $C_3$ to $C_{20}$ olefins, any $C_4$ to $C_{20}$ linear, cyclic or branched dienes or trienes and any styrenic monomers such as styrene, alpha-methyl styrene, or para-methyl styrene. Preferred examples include butadiene, pentadiene, cyclopentadiene, hexadiene, cyclohexadiene, heptadiene, octadiene, nonadiene, norbornene, vinyl norbornene, ethylidene norbornene, isoprene and heptadiene.

The $C_3$ to $C_{20}$ and $C_4$ to $C_{20}$ olefins can be any polymerizable olefin monomer and are preferably a linear, branched or cyclic olefin, even more preferably an alpha-olefin. Examples of suitable olefins include propylene, butene, isobutylene, pentene, isopentene, cyclopentene, hexene, isohexene, cyclohexene, heptene, isoheptene, cycloheptene, octene, isooctene, cyclooctene, nonene, cyclononene, decene, isodecene, dodecene, isodecene, 4-methyl-pentene-1,3-methyl-pentene-1,3,5,5-trimethyl hexene-1. Suitable comonomers also include dienes, trienes, and styrenic monomers. Preferred examples include styrene, alpha-methyl styrene, para-alkyl styrene (such as para-methyl styrene), hexadiene, norbornene, vinyl norbornene, ethylidene norbornene, butadiene, isoprene, heptadiene, octadiene, and cyclopentadiene. Preferred comonomers for the copolymer of ethylene are propylene, butene, hexene and/or octene.

In certain embodiments, the meltblown resin can include one or more polyalphaolefins (PAOs). PAOs are high purity hydrocarbons, with a fully paraffinic structure and a high degree of branching. Suitable PAOs are liquids with a pour point of −10° C. or less and a kinematic viscosity at 100° C. (KV100° C.) of 3 cSt or more. Such PAOs can include $C_{15}$ to $C_{1500}$ (preferably $C_{20}$ to $C_{1000}$, preferably $C_{30}$ to $C_{800}$, preferably $C_{35}$ to $C_{400}$, most preferably $C_{40}$ to $C_{250}$) oligomers (such as dimers, trimers, etc) of $C_3$ to $C_{24}$ (preferably $C_5$ to $C_{18}$, preferably $C_6$ to $C_{14}$, preferably $C_8$ to $C_{12}$) alpha-olefins, preferably linear alpha-olefins (LAOs), provided that $C_3$ and $C_4$ alpha-olefins are present at 30 wt % or less (preferably 20 wt % or less, preferably 10 wt % or less, preferably 5 wt % or less). Suitable LAOs include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, and blends thereof.

In one or more embodiments, a single LAO is used to prepare the oligomers. A preferred embodiment involves the oligomerization of 1-octene or 1-decene, preferably 1-decene. In one or more embodiments, the PAO is or includes oligomers of two or more $C_3$ to $C_{18}$ LAOS, to make 'bipolymer' or 'terpolymer' or higher-order copolymer combinations, provided that $C_3$ and $C_4$ LAOs are present 30 wt % or less (preferably 20 wt % or less, preferably 10 wt % or less, preferably 5 wt % or less). A preferred embodiment involves oligomerization of a mixture of LAOs selected from $C_6$ to $C_{18}$ LAOs with even carbon numbers. Another preferred embodiment involves oligomerization of 1-octene, 1-decene, and 1-dodecene.

In one or more embodiments, the PAO comprises oligomers of a single alpha-olefin species having a carbon number of 5 to 24 (preferably 6 to 18, more preferably 8 to 12, most preferably 10). In one or more embodiments, the PAO comprises oligomers of mixed alpha-olefins (i.e., two or more alpha-olefin species), each alpha-olefin having a carbon number of 5 to 24 (preferably 6 to 18, preferably 8 to 12). In one or more embodiments, the PAO comprises oligomers of mixed alpha-olefins (i.e., involving two or more alpha-olefin species) where the weighted average carbon number for the alpha-olefin mixture is 6 to 14 (preferably 8 to 12, preferably 9 to 11).

In one or more embodiments, the PAO or blend of PAOs has a number-average molecular weight ($M_n$) of from 400 to 15,000 g/mol (preferably 400 to 12,000 g/mol, preferably 500 to 10,000 g/mol, preferably 600 to 8,000 g/mol, preferably 800 to 6,000 g/mol, preferably 1,000 to 5,000 g/mol). In one or more embodiments, the PAO or blend of PAOs has a $M_n$ greater than 1,000 g/mol (preferably greater than 1,500 g/mol, preferably greater than 2,000 g/mol, preferably greater than 2,500 g/mol).

In one or more embodiments, the PAO or blend of PAOs has a KV100° C. of 3 cSt or more (preferably 4 cSt or more, preferably 5 cSt or more, preferably 6 cSt or more, preferably 8 cSt or more, preferably 10 cSt or more, preferably 20 cSt or more, preferably 30 cSt or more, preferably 40 cSt or more, preferably 100 or more, preferably 150 cSt or more). In one or more embodiments, the PAO has a KV100° C. of 3 to 3,000 cSt (preferably 4 to 1,000 cSt, preferably 6 to 300 cSt, preferably 8 to 150 cSt, preferably 8 to 100 cSt, preferably 8 to 40 cSt). In one or more embodiments, the PAO or blend of PAOs has a KV100° C. of 10 to 1000 cSt (preferably 10 to 300 cSt, preferably 10 to 100 cSt). In yet another embodiment, the PAO or blend of PAOs has a KV100° C. of 4 to 8 cSt. In yet another embodiment, the PAO or blend of PAOs has a KV100° C. of 25 to 300 cSt (preferably 40 to 300 cSt, preferably 40 to 150 cSt). In one or more embodiments, the PAO or blend of PAOs has a KV100° C. of 100 to 300 cSt.

In one or more embodiments, the PAO or blend of PAOs has a Viscosity Index (VI) of 120 or more (preferably 130 or more, preferably 140 or more, preferably 150 or more, preferably 170 or more, preferably 190 or more, preferably 200 or more, preferably 250 or more, preferably 300 or more). In one or more embodiments, the PAO or blend of PAOs has a VI of 120 to 350 (preferably 130 to 250).

In one or more embodiments, the PAO or blend of PAOs has a pour point of −10° C. or less (preferably −20° C. or less, preferably −25° C. or less, preferably −30° C. or less, preferably −35° C. or less, preferably −40° C. or less, preferably −50° C. or less). In one or more embodiments, the PAO or blend of PAOs has a pour point of −15° C. to −70° C. (preferably −25° C. to −60° C.).

In one or more embodiments, the PAO or blend of PAOs has a glass transition temperature ($T_g$) of −40° C. or less (preferably −50° C. or less, preferably −60° C. or less, preferably −70° C. or less, preferably −80° C. or less). In one or more embodiments, the PAO or blend of PAOs has a $T_g$ of −50° C. to −120° C. (preferably −60° C. to −100° C., preferably −70° C. to −90° C.).

In one or more embodiments, the PAO or blend of PAOs has a flash point of 200° C. or more (preferably 210° C. or more, preferably 220° C. or more, preferably 230° C. or more), preferably between 240° C. and 290° C. In one or more embodiments, the PAO or blend of PAOs has a specific gravity (15.6° C.) of 0.86 or less (preferably 0.855 or less, preferably 0.85 or less, preferably 0.84 or less).

In one or more embodiments, the PAO or blend of PAOs has a molecular weight distribution ($M_w/M_n$) of 2 or more (preferably 2.5 or more, preferably 3 or more, preferably 4 or more, preferably 5 or more, preferably 6 or more, preferably 8 or more, preferably 10 or more). In one or more embodiments, the PAO or blend of PAOs has a $M_w/M_n$ of 5 or less (preferably 4 or less, preferably 3 or less) and a KV100° C. of 10 cSt or more (preferably 20 cSt or more, preferably 40 cSt or more, preferably 60 cSt or more).

Desirable PAOs are commercially available as SpectraSyn™ and SpectraSyn Ultra™ from ExxonMobil Chemical (USA). Other useful PAOs include those available as Synfluid™ from ChevronPhillips Chemical (USA), as Durasyn™ from Innovene (USA), as Nexbase™ from Neste Oil (Finland), and as Synton™ from Chemtura (USA). For PAOs, the percentage of carbons in chain-type paraffinic structures (Cp) is close to 100% (typically greater than 98% or even 99%). Additional details are described in, for example, U.S. Pat. Nos. 3,149,178; 4,827,064; 4,827,073; 5,171,908; and 5,783,531 and in Synthetic Lubricants and High-Performance Functional Fluids (Leslie R. Rudnick & Ronald L. Shubkin, ed. Marcel Dekker, Inc. 1999), pp. 3-52.

In one or more specific embodiments, each discrete extensible region comprises polyacrylonitrile, polybutylene terephthalate, polyethylene terephthalate (PET), polycyclohexylenedimethylene terephthalate (PCT), polyamide and/or acrylic, RCPs, ICPs or blends of polypropylene and propylene-ethylene copolymers. In one or more specific embodiments, each discrete inelastic region comprises polyester, homopolypropylene, polypropylene, polyethylene, blends thereof, or blends with one or more polyalphaolefins. In one or more specific embodiments, each elastic region comprises one or more elastomers selected from the group consisting of propylene-α-olefin copolymer, natural rubber, synthetic polyisoprene, butyl rubber, halogenated butyl rubbers, polybutadiene, styrene-butadiene rubber, styrenic block copolymers, nitrile rubber, hydrogenated nitrile rubbers, chloroprene rubber, polychloroprene, neoprene, ethylene-propylene rubber and ethylene-propylene-diene rubber, epichlorohydrin rubber, polyacrylic rubber, silicone rubber, fluorosilicone rubber, fluoroelastomers, perfluoroelastomers, polyether block amides, chlorosulfonated polyethylene, ethylene-vinyl acetate, ethylene-α-olefin random and block copolymers, thermoplastic elastomers, thermoplastic vulcanizates, thermoplastic polyurethane, thermoplastic olefins, polysulfide rubber, and blends of any two or more thereof.

Additives

Any of the resins or discrete regions can further include one or more additives. Suitable additives can include any one or more processing oils (aromatic, paraffinic and napthathenic mineral oils), compatibilizers, calcined clay, kaolin clay, nanoclay, talc, silicates, carbonates, sulfates, carbon black, sand, glass beads, mineral aggregates, wollastonite, mica, glass fiber, other filler, pigments, colorants, dyes, carbon black, filler, dispersants, flame retardants, antioxidants, conductive particles, UV-inhibitors, stabilizers, light stabilizer, light absorber, coupling agents including silanes and titanates, plasticizers, lubricants, hydrocarbon resins (e.g., Oppera™ resins, Picolyte™ tackifiers, polyisobutylenes, etc.) and other tackifiers, blocking agents, antiblocking agents, antistatic agents, waxes, foaming agents, nucleating agents, slip agents, acid scavengers, lubricants, adjuvants, surfactants, crystallization aids, polymeric additives, defoamers, preservatives, thickeners, rheology modifiers, humectants, coagents, vulcanizing/cross-linking/curative agents, vulcanizing/cross-linking/curative accelerators, cure retarders and combinations thereof.

Composite

In certain embodiments, any number of other layers such as "secondary layers" or "facing layers" can be disposed on the ICMMF to form a composite. Such layers can add a soft or other aesthetically pleasing feel to the fabrics and/or provide extensibility to allow the ICMMF to stretch and retract. There can be any number of layers, such as two, three, four or more layers of fabric adjacent to the ICMMF layer. These "secondary layers" or "facing layers" can be a single fabric composition and therefore non-modulated.

The secondary layers or facing layers can include monoconstituent or biconstituent fibers and made from any material that can be meltspun, is extensible, or any material that can be made extensible through mechanical means. In certain embodiments, the secondary layers or facing layers comprise a material selected from the group consisting of polypropylene (e.g., homopolymers, impact copolymers, copolymers), polyethylene (e.g., LDPE, LLDPE, HDPE (copolymers and block copolymers)), functionalized polyolefins (e.g., Exxelor™ maleic anhydride functionalized elastomeric ethylene copolymers), plastomers (e.g., ethylene-α-olefin copolymers), polyurethane, polyesters such as polyethylene terephthalate, polylactic acid, polyvinyl chloride, polytetrafluoroethylene, styrenic block copolymers, ethylene vinyl acetate copolymers, polyamide, polycarbonate, cellulosics (e.g., Rayon™, Lyocell™, Tencil™), an elastomer, poly(acetylene), poly(thiophene), poly(aniline), poly(fluorene), poly (pyrrole), poly(3-alkylthiophene), poly(phenylene sulphide), polynaphthalenes, poly(phenylene vinylene), poly(vinylidene fluoride), and blends of any two or more of these materials.

In at least one specific embodiment, an exemplary composite can include the ICMMF and at least one secondary layer that is a facing layer consisting essentially of one or more inelastic resins or one or more extensible resins. In at least one other specific embodiment, an exemplary composite can include two or more ICMMFs. For example, an exemplary composite can include a first ICMMF and a second ICMMF, where both ICMMFs include a plurality of discrete regions of fiber, wherein at least two discrete regions of fiber are inelastic or extensible and at least one discrete region of fiber is elastic or extensible, and where the first and second ICMMFs are each compositionally modulated, the same or different, in the cross direction. An illustrative non-modulated, facing layer includes polypropylene thermobonded or through air bonded carded fabrics or spunlace fabrics.

In at least one specific embodiment, an exemplary composite can include a first layer comprising a plurality of discrete regions of fiber, and a second layer comprising a plurality of discrete regions of fiber. The discrete regions of fiber can be elastic, inelastic, and/or extensible that are compositionally modulated in the cross direction. Preferably, at least two discrete regions of fiber are inelastic or extensible and at least one discrete region of fiber is elastic or extensible.

In at least one specific embodiment, an exemplary composite can include a first layer comprising a plurality of discrete regions of fiber, a second layer comprising a plurality of discrete regions of fiber, and at least one facing layer disposed at least partially on the first layer, the second layer, or both the first and second layers. Each layer can include any one or more inelastic, elastic, and/or extensible resins. In one embodiment, the discrete regions of fiber of the first layer are at least partially disposed on the discrete regions of fiber of the second layer. For example, the inelastic or extensible discrete regions of fiber of the first layer can be at least partially disposed on the inelastic or extensible discrete regions of fiber of the second layer. In another example, the elastic discrete regions of fiber of the first layer can be at least partially disposed on the elastic discrete regions of fiber of the second layer. In yet another example, the inelastic or extensible discrete regions of fiber of the first layer can at least partially disposed on the elastic discrete regions of fiber of the second layer. In still yet another example, the elastic discrete regions of fiber of the first layer can be at least partially disposed on the inelastic or extensible discrete regions of fiber of the second layer.

Additives

Each zone or region of the ICMMF can further include one or more additives. The additives may be present at any desirable level, examples of which include from 0.01 to 0.5 or 2 or 5 or 10 wt %, by weight of the fiber. As used herein, "additives" include, for example, stabilizers, surfactants, antioxidants, anti-ozonants (e.g., thioureas), fillers, migrating (preventative) agent, colorants, nucleating agents, anti-block agents, UV-blockers/absorbers, hydrocarbon resins (e.g., Oppera™ resins, Picolyte™ tackifiers, polyisobutylenes, etc.) and other tackifiers, oils (e.g., paraffinic, mineral, aromatic, synthetic), slip additives, hydrophilic additives (e.g., Irgasurf™ 560 HL), hydrophobic additives (e.g., wax) and combinations thereof. Primary and secondary antioxidants include, for example, hindered phenols, hindered amines, and phosphates. Slip agents include, for example, oleamide and erucamide. Examples of fillers include carbon black, clay, talc, calcium carbonate, mica, silica, silicate, and combinations thereof. Other additives include dispersing agents and catalyst deactivators such as calcium stearate, hydrotalcite, and calcium oxide, and/or other acid neutralizers known in the art. The additives may be added to the materials that make up the various layers of the ICMMF and/or composite by any means such as by dry blending the additive with pellets of the pure polymer material prior to meltspinning, or by obtaining the fabric material already possessing the additive(s).

Region Arrangements

The ICMMF can include any number of discrete zones or regions. For example, the ICMMF can include two or more discrete regions, where at least one region is inelastic or extensible and at least one region that is elastic or extensible. In certain embodiments, the ICMMF can include two or more discrete regions, three or more discrete regions, four or more discrete regions, five or more discrete regions, six or more discrete regions, seven or more discrete regions, eight or more discrete regions, nine or more discrete regions, ten or more discrete regions, eleven or more discrete regions, twelve or more discrete regions, thirteen or more discrete regions, fourteen or more discrete regions, or fifteen or more discrete regions. Preferably, adjoining discrete regions alternate between elastic and inelastic; or between elastic and extensible; or between inelastic and extensible. In certain embodiments, however, it may be desirable to have two or more adjoining regions that are each inelastic, or two or more adjoining regions that are each elastic, or two or more adjoining regions that are extensible. In certain embodiments, it may be desirable to have a first set of two or more adjoining discrete regions and a second set of two or more adjoining discrete regions, wherein each region can be inelastic, extensible, and/or elastic. For example, each of the first set or each of the second set can independently include the following structures: I/I, E/E, I/E, I/E/I, I/I/E, I/E/E, I/E/I/E, I/E/E/I, and I/E/I/I, wherein "I" refers to one or more inelastic or extensible materials and "E" refers to one or more elastic or extensible materials.

In one or more specific embodiments, the discrete regions are substantially parallel to one another in the machine direction. In one or more specific embodiments, the discrete regions alternate with respect to one another in the cross direction. In one or more specific embodiments, the discrete regions are substantially parallel to one another in the machine direction, and alternate with respect to one another in the cross direction. Furthermore, the ICMMF can be compositionally modulated in the z-direction, meaning two or more discrete regions can be disposed one on top of another.

Bicomponent Fibers and Different Shapes

In certain embodiments, the fibers used to form any one or all of the discrete regions in the ICMMF can be bicomponent or "conjugate" fibers. These include structures that are side-by-side, segmented, sheath/core, islands-in-the-sea structures ("matrix fibril"), and others as is known in the art. Thus, a bicomponent fiber is one that has a cross-sectional morphology that is at least bi-phasic in varying geometries. In certain embodiments, at least one of the polymers used to make the fiber is a propylene-α-olefin copolymer. The second, third, etc. component of the conjugate fiber may be made from any suitable materials such as polypropylene, polyethylene (e.g., LDPE, LLDPE, HDPE), plastomers (e.g., ethylene-α-olefin copolymers), polyurethane, polyesters such as polyethylene terephthanlate, polylactic acid, polyvinyl chloride, polytetrafluoroethylene, styrenic block copolymers, propylene-α-olefin copolymers (e.g., Vistamaxx), ethylene-α-olefin random or block copolymer elastomers (e.g., Infuse™ elastomers), ethylene vinyl acetate copolymers, polyamide, polycarbonate, cellulosics (e.g., cotton, Rayon™, Lyocell™, Tencil™), wood, viscose, and blends of any two or more of these materials. A particularly preferred second (or third, etc.) component is a polyethylene. The main objective of producing bicomponent fibers is to exploit capabilities not existing in either polymer alone. By this technique, it is possible to produce fibers of any cross sectional shape or geometry that can be imagined. Side-by-side fibers are generally used as self-crimping fibers. There are several systems used to obtain a self-crimping fiber. One of them is based on different shrinkage characteristics of each component. There have been attempts to produce self-crimping fibers based on different electrometric properties of the components. Some types of side-by-side fibers crimp spontaneously as the drawing tension is removed and others have "latent crimp," appearing when certain ambient conditions are obtained. In some embodiments "reversible" and "non-reversible" crimps are used, when reversible crimp can be eliminated as the fiber is immersed in water and reappears when the fiber is dried. This phenomenon is based on swelling characteristics of the components. Different melting points on the sides of the fiber are taken advantage of when fibers are used as bonding fibers in thermally bonded non-woven webs.

Sheath-core bicomponent fibers are those fibers where one of the components (core) is fully surrounded by the second component (sheath). In certain embodiments, the fibers of one or more of the layers of the ICMMF are bicomponent. Adhesion is not always essential for fiber integrity. The most common way of production of sheath-core fibers is a technique where two polymer liquids are separately led to a position very close to the spinneret orifices and then extruded in sheath-core form. In the case of concentric fibers, the orifice supplying the "core" polymer is in the center of the spinning orifice outlet and flow conditions of core polymer fluid are strictly controlled to maintain the concentricity of both components when spinning Eccentric fiber production is based on several approaches: eccentric positioning of the inner polymer channel and controlling of the supply rates of the two component polymers; introducing a varying element near the supply of the sheath component melt; introducing a stream of single component merging with concentric sheath-core component just before emerging from the orifice; and deformation of spun concentric fiber by passing it over a hot edge. Matrix fibril fibers are spun from the mixture of two polymers in the required proportion; where one polymer is suspended in droplet form in the second melt. A feature in production of matrix-fibril fibers is the desirability of artificial cooling of the fiber immediately below the spinneret orifices. Different spinnability of the two components would almost disable the spinnability of the mixture, except for low concentration mixtures (less than 20%).

Also in certain embodiments any one or all of the discrete regions in the ICMMF can be a mixed-fiber fabric comprising propylene-based fibers. Suitable mixed-fiber fabrics are disclosed in, for example, US 2008/0038982. There can be one, two, or more other types of fibers with the propylene-based fibers include fibers made from polypropylene, polyethylene, plastomers, polyurethane, polyesters such as polyethylene terephthalate, polylactic acid, polyvinyl chloride, polytetrafluoroethylene, styrenic block copolymers, propylene-α-olefin copolymers (e.g., Vistamaxx™) or other elastomers as described herein, ethylene vinyl acetate copolymers, polyamide, polycarbonate, cellulosics (e.g., cotton, Rayon™, Lyocell™, Tencil™), wood, viscose, and blends of any two or more of these materials.

Post-Treatment

Various additional processing and/or finishing steps known in the art, such as slitting, treating, printing graphics, etc., can be performed on the ICMMF or composites made therefrom without departing from the spirit and scope of the invention. For instance, the ICMMF, with or without secondary layers, may be incrementally stretched or activated by mechanical means in the cross-machine direction ("CD") and/or machine directions ("MD") to enhance loft, feel and extensibility. In one embodiment, the ICMMF may be coursed through two or more rolls that have grooves in the CD and/or MD directions. Such grooved satellite/anvil roll arrangements are described in US 2004/0110442 and US 2006/0151914 and U.S. Pat. No. 5,914,084. The grooved rolls may be constructed of steel or other hard material (such as a hard rubber). If desired, heat may be applied by any suitable method known in the art, such as heated air, infrared heaters, heated nipped rolls, or partial wrapping of the ICMMF around one or more heated rolls or steam canisters, etc. Heat may also be applied to the grooved rolls themselves. It should also be understood that other grooved roll arrangement are equally suitable, such as two grooved rolls positioned immediately adjacent to one another. Besides grooved rolls, other techniques may also be used to mechanically stretch the composite in one or more directions. For example, self centering intermeshing discs as described in U.S. Pat. No. 4,223,059, U.S. Pat. No. 4,285,100 and U.S. Pat. No. 4,368,565, can mechanically stretch a nonwoven web in MD and/or CD. Further extensions of this process are described in U.S. Pat. No. 5,422,172, U.S. Pat. No. 5,156,793, U.S. Pat. No. 5,167,897 U.S. Pat. No. 5,143,679 and US 2007/0197117, which describe how this technology can be used in-line on a diaper line to incrementally stretch narrow strips of laminate. In another example, the composite may be passed through a tenter frame that stretches the composite. Such tenter frames are well known in the art and described, for instance, in US 2004/0121687. Finally, the ICMMF may be such that it needs no activation and is simply formed onto and/or bound to a secondary layer to form a composite.

As mentioned above, the ICMMF may form a composite either with itself or with one or more other secondary layers. The joining or bonding of the various layers of a multi-layer structure such as the ICMMF and/or composite comprising the ICMMF can be done such that CD and/or MD orientation is imparted into the ICMMF and/or composite. Many approaches may be taken to form a multi-layered composite comprising the ICMMF. One approach is to fold, corrugate, crepe, or otherwise gather the ICMMF prior to bonding it to the secondary layer. The gathered ICMMF is bonded to the secondary layer at specified points or lines, not continually across the surface of the layer. While the film/fabric is in a relaxed state, the fabric remains corrugated or puckered on the film; once the elastomeric film is stretched, the fabric layer flattens out until the puckered material is essentially flat, at which point the elastomer stretching ceases.

Another approach to impart CD and/or MD stretch is to stretch the elastomeric film/fabric, then bond the fabric to the film while the film is stretched. Again, the fabric is bonded to the film at specified points or lines rather than continually across the surface of the film. When the stretched film is allowed to relax, the fabric corrugates or puckers over the unstretched elastomeric film.

Yet another approach is to "neck" the fabric prior to bonding it to the elastomer layer as described in U.S. Pat. No. 5,336,545, U.S. Pat. No. 5,226,992, U.S. Pat. No. 4,981,747 and U.S. Pat. No. 4,965,122. Necking is a process by which the fabric is pulled in one direction, which causes the fibers in the fabric to slide closer together, and the width of the fabric in the direction perpendicular to the pulling direction is reduced. If the necked fabric is point-bonded to an elastomeric layer, the resulting layered structure will stretch somewhat in a direction perpendicular to the direction in which the fabric was pulled during the necking process, because the fibers of the necked fabric can slide away from one another as the layered structure stretches.

In one or more embodiments, the ICMMF or composite therefrom can be carded. The term "carding" refers to the process of disentangling, cleaning, and intermixing fibers to make a web for further processing into a nonwoven fabric and is well known in the art. The aim is to take a mass of fiber tufts and produce a uniform, clean web. An example of a method of carding is described in U.S. Pat. No. 4,105,381. The process predominantly aligns the fibers which are held together as a web by mechanical entanglement and fiber-fiber friction.

In certain embodiments, the ICMMFs and/or composites may comprise one or more coform fabric layers. Methods for forming such fabrics are described in, for example, U.S. Pat. No. 4,818,464 and U.S. Pat. No. 5,720,832. Generally, fabrics of two or more different thermoplastic and/or elastomeric materials may be formed. For example, the coform fabrics described herein may comprise from 1 or 5 or 10 or 20 or 40 or 50 to 60 or 70 or 80 or 90 or 99 wt % of the a thermoplastic like polypropylene or an elastomer such as a propylene-$\alpha$-olefin and from 99 or 90 or 80 or 70 or 60 to 50 or 40 or 20 or 10 or 5 or 1 wt % of another thermoplastic material such as another polypropylene, polyethylene, polyurethane, etc., or an elastomer such as a propylene-$\alpha$-olefin copolymer elastomer or a styrenic block copolymer. Thus, in one aspect is provided the introduction of molten extruded primary material (e.g., polypropylene or an elastomer) and optionally one or more other materials (elastomeric, super absorbent polymer, pulp, additional adsorbent, thermoplastic, etc.) to the shear layers of at least one rapidly moving stream or jet of an inert gas from two or more extrusion openings or sets of openings placed surrounding or on alternate or opposite sides of the high velocity gas delivery nozzle. The material which is extruded from these openings may be the same material or, alternatively, materials which differ from one another in their chemical and/or physical properties. Designated as first, second, etc., thermoplastic, absorbent or elastomeric material, the materials may be of the same or different chemical composition or molecular structure and, when of the same molecular structure, may differ in molecular weight or other characteristics which results in differing physical properties. In those situations in which thermoplastic materials are used which differ from one another in some respect, such as in physical properties, the extrusion or die head will be provided with multiple chambers, one for each of the thermoplastic materials, such as first, second, etc., thermoplastic materials. That is, the die head is provided with a first chamber for the first thermoplastic material and a second chamber for the second thermoplastic material, etc. In contrast, such an arrangement where a single chamber is provided with conduits or passages which provide communication between the single chamber and each of the first and the second thermoplastic extrusion outlet openings, when a first chamber and a second chamber are employed for first and second thermoplastic materials, respectively, each chamber is provided with passages to only one extrusion outlet opening or set of openings. Thus, the first thermoplastic material chamber communicates with the first extrusion outlet opening by means of the first thermoplastic material passage, while the second thermoplastic material chamber communicates with the second thermoplastic extrusion opening through the second thermoplastic material passage.

Meltspinning Process

The formation of the ICMMF requires the manufacture of fibers by extrusion followed by spinning through a meltspinning apparatus that includes at least one die capable of handling the appropriate melt temperatures and pressures to spin fine denier fibers. In particular, the apparatus has at least one die comprising multiple nozzles, each fluidly connected to its own extruder to allow different materials to be meltspun through the nozzles. The nozzle defines a narrow orifice through which the molten polymer is meltspun into a filament. Each die can have any number of nozzles, the nozzle density ranging from 20 or 40 or 50 nozzles/in to 120 or 150 or 200 or 300 or 350 nozzles/inch. The extrusion process is typically accompanied by mechanical or aerodynamic drawing of the fibers.

In certain embodiments, the process of making the ICMMFs and fabrics excludes any visbreaking agents from the extruder and other parts of the apparatus. By "excludes" or "excluded," what is meant is that visbreaking agents such as peroxides, hydroxylamine esters, and other oxidizing and free-radical generating agents are not added to the extruder or any other component of the apparatus downstream of the extruder in the meltblowing apparatus. Thus, the copolymer being blown into a fiber and fabric is the copolymer having the desired MFR as introduced into the extruder feeding the meltspinning apparatus.

The ICMMFs may be manufactured by any technique known in the art capable of in-situ meltspinning to form the two or more discrete regions of fibers. Examples of suitable meltspinning equipment that may be modified for producing the ICMMFs (and the fibers that make up the fabrics) described herein are in U.S. Pat. No. 4,380,570, U.S. Pat. No. 5,476,616, US 2004/0209540, and by R. Zhao, "Melt Blowing Polyoxymethylene Copolymer" in INT'L NONWOVENS J., pp. 19-24 (Summer 2005).

FIG. 1 depicts an illustrative vertical cross-sectional view of a meltspinning array die 100 capable of producing the ICMMF, according to one or more embodiments. The die 100 can include at least two zones (two are shown 110, 120) for delivering molten polymer through a plurality of spinneret nozzles 130 to form the ICMMF 150 having at least two discrete regions of fiber 150A, 150B. Each zone 110, 120 can be in fluid communication with the same or different polymer resin to form the discrete regions 150A, 150B of the ICMMF 150. Although not shown, the fibers exiting the spinneret nozzles 130 can be collected on a moving mesh screen, moving belt, or collecting (smooth or patterned/embossed) drum(s) located below or across from the nozzles 130, as is commonly known in the art, to form the ICMMF 150.

Figure 2A:
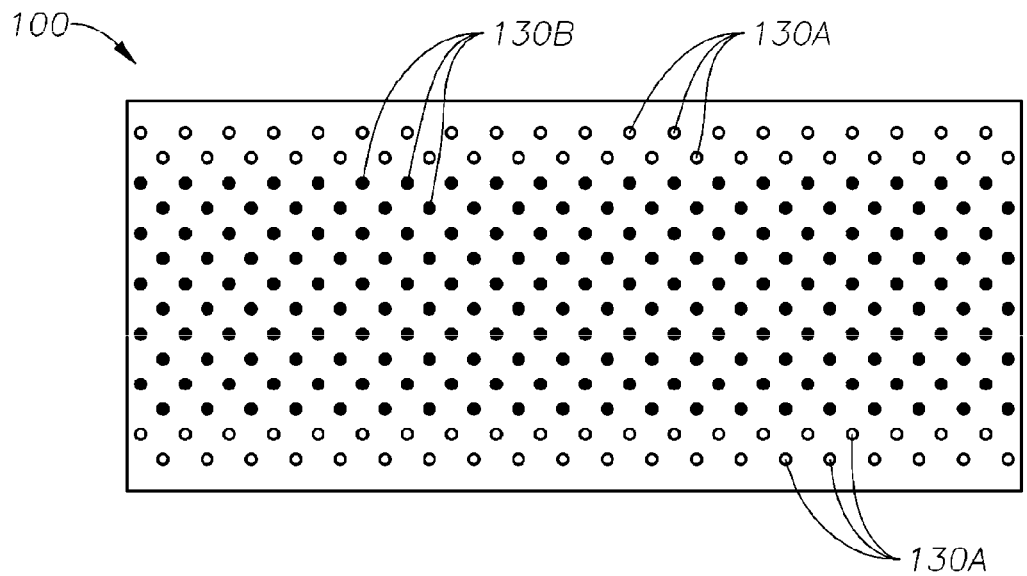
FIG. 2A depicts an illustrative perspective view of the array die 100 depicted in FIG. 1, according to one or more embodiments.
Figure 2B:
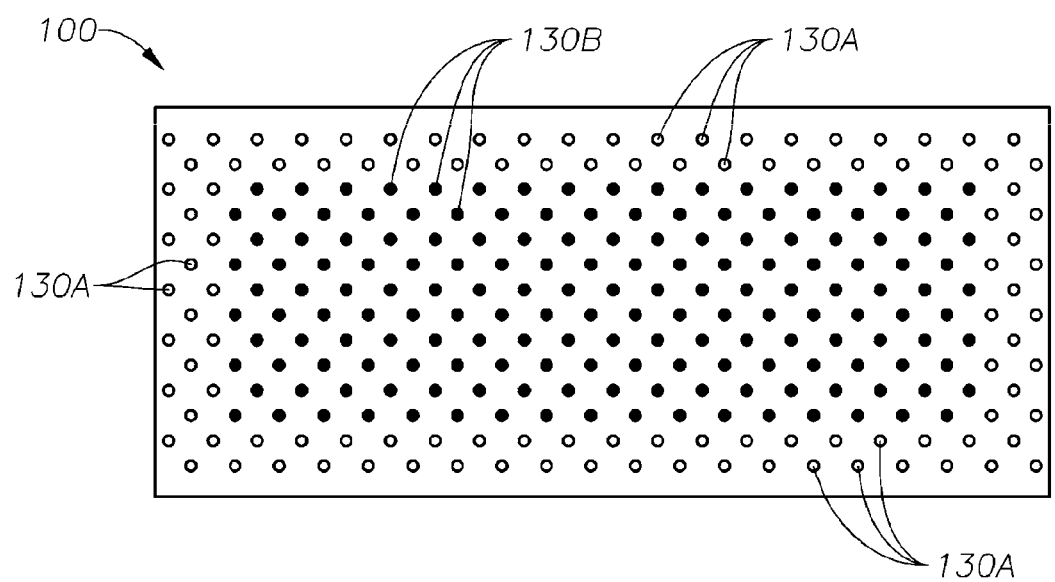
FIG. 2B depicts an illustrative perspective view of the array die 100 depicted in FIG. 1, according to another embodiment.

FIGS. 2A and 2B depict illustrative perspective views of the array die 100 depicted in FIG. 1. Referring to FIGS. 1, 2A, and 2B, a first set of nozzles 130A can be in fluid communication with the first zone 110, and a second set of nozzles 130B can be in fluid communication with the second zone 120. The number of nozzles 130A, 130B can be the same or different and any number of nozzles 130A and 130B can be used, depending on the desired performance attribute of the discrete region of fiber. Additionally, the physical and compositional characteristics of the different discrete regions of fiber 150A, 150B can be controlled or manipulated depending on the polymer or polymer blends used to produce the discrete region so that the discrete regions can be compositionally modulated in the cross direction and/or z-direction (i.e. through the thickness of the resulting fabric or fabric layer).

Examples of such control or manipulation include having different MFR resins such that when attenuated under the same aerodynamic drawing conditions results in different diameter fibers, alternatively the extruders that are fluidly connected to the different nozzles 130A and 130B are running at different pressures such that the polymer throughput through the nozzles per unit time for these different regions is different resulting in different fiber diameters, fiber morphology, fabric structure, etc. Although not shown, a suitable meltspinning apparatus for making the ICMMFs is not limited to only one array die 100, as there can be multiple dies 100 each fluidly connected to its own melt extruder.

As will be explained in more detail below, the array die 100 can be used to produce an ICMMF having a plurality of different zones or discrete regions running parallel to one another in the machine direction. Each discrete region can possess different performance attributes depending on the polymer or polymer blends used to produce the region.

Figure 3:
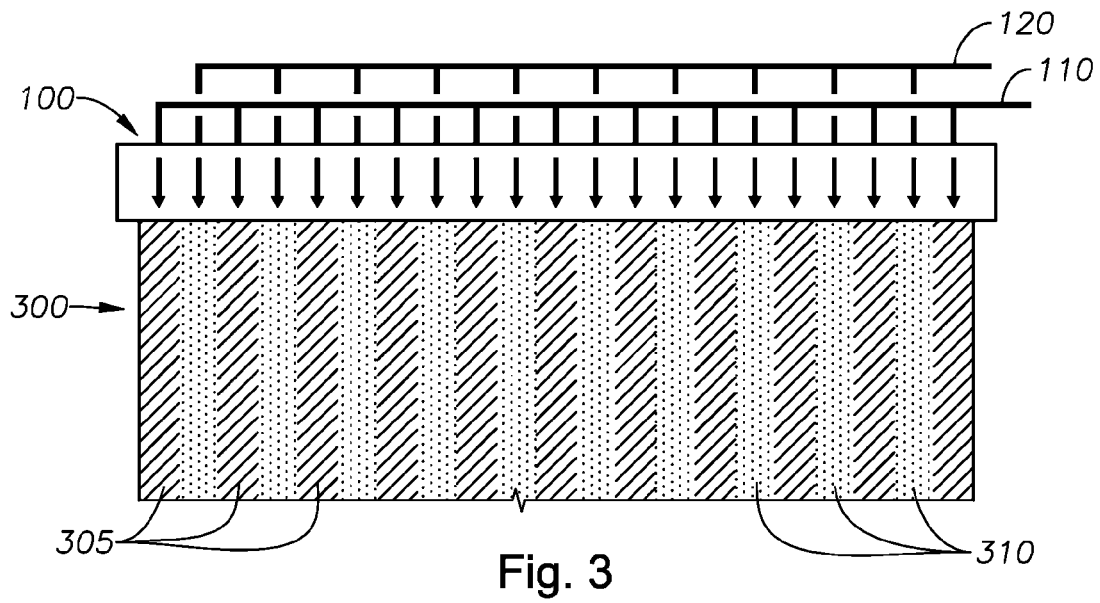
FIG. 3 depicts a schematic top view of an illustrative ICMMF having a plurality of discrete regions of fiber, according to one or more embodiments.

FIG. 3 depicts a schematic top view of an illustrative ICMMF having a plurality of discrete regions of fiber, according to one or more embodiments. As depicted, the array die 100 as shown in FIG. 1 can be used to meltspin two or more polymer or polymer blends through two or more zones 110, 120 to produce an ICMMF 300 having alternating discrete regions of fiber 305, 310. In one embodiment, the plurality of discrete regions 305 can be made of inelastic or extensible polymer or polymer blends. In one or more embodiments, the plurality of discrete regions 310 can be made of elastic or extensible polymer or polymer blends.

Each region 305 can be made of the same polymer or polymer blends or from different polymer or polymer blends. Each region 310 can be made of the same polymer or polymer blends or from different polymer or polymer blends. In one or more embodiments, each region 305, 310 can be made of the same polymer or polymer blends or from different polymer or polymer blends provided that the regions 305 remains inelastic or extensible and the regions 310 remain elastic or extensible. Since each region 305, 310 can be compositionally different in the cross direction of the ICMMF 300, the ICMMF is considered to be "compositionally modulated," as defined herein above.

Although not shown, the discrete regions of fiber 305 can each have the same width and/or thickness. Alternatively, each discrete region 305 can have a different width and/or thickness. Similarly, the discrete regions of fiber 310 can each have the same width and/or thickness, and/or each discrete region 310 can have a different width and/or thickness.

Figure 4:
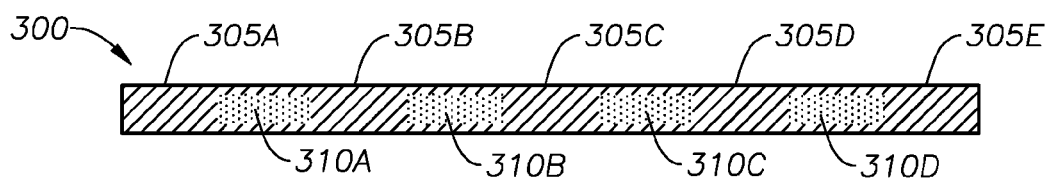
FIG. 4 depicts a schematic partial, cross sectional view of an illustrative ICMMF in the machine direction, according to one or more embodiments.

FIG. 4 depicts a schematic partial, cross sectional view of the ICMMF 300 in the machine direction, according to one or more embodiments. As depicted, the ICMMF 300 from FIG. 3 can include multiple regions of fiber, such as a first polymer material or region (five discrete regions of a first polymer are shown 305A, 305B, 305C, 305D, 305E) disposed about and between a second polymer material or region (four discrete regions of a second polymer are shown 310A, 310B, 310C, 310D). In this embodiment, the second polymer regions 310A-D are encapsulated by the first polymer regions 305A-E.

Figure 5:
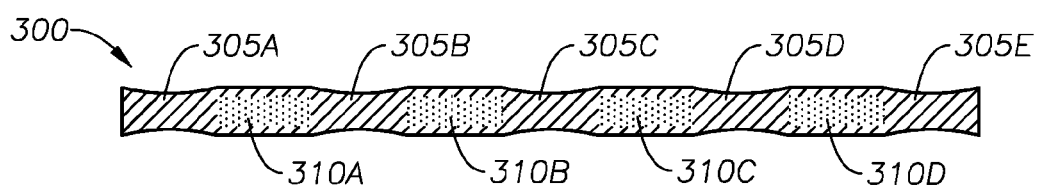
FIG. 5 depicts another schematic partial, cross sectional view of an illustrative ICMMF in the machine direction, according to another embodiment.

FIG. 5 depicts another schematic partial, cross sectional view of the ICMMF 300 in the machine direction, according to another embodiment. As depicted, the first polymer regions 305A-E of the ICMMF 300 have a lighter basis weight and are thus thinner.

Figure 6:
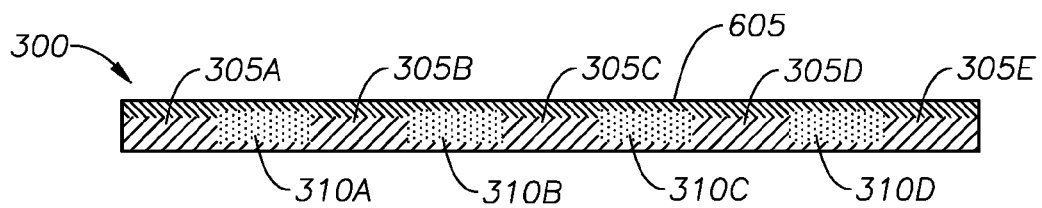
FIG. 6 depicts yet another schematic partial, cross sectional view of an illustrative ICMMF 300 in the machine direction, according to yet another embodiment.

FIG. 6 depicts yet another schematic partial, cross sectional view of the ICMMF 300 in the machine direction, according to yet another embodiment. As depicted, the ICMMF 300 includes a secondary or facing layer 605 disposed thereon. The facing layer 605 can be elastic, inelastic, or extensible. The facing layer 605 can be made of the same or different polymer or polymer blends as the discrete regions 305A-E and/or discrete regions 310A-D. In one or more embodiments, the facing layer 605 can be the same or different in type and/or structure than the discrete regions 305A-E and/or the discrete regions 310A-D.

It is believed that the ICMMF can provide different performance attributes in the plane of the fabric in addition to the conventional multilayer fabrics that offer different performance attributes. Such composites made of the ICMMF and conventional multilayer fabrics could be used in a range of industries and consumer products that currently use non-woven fabrics. Such composites can provide various fabric functionalities in a single fabric composite which conventionally requires two or more fabrics.

Figure 7:
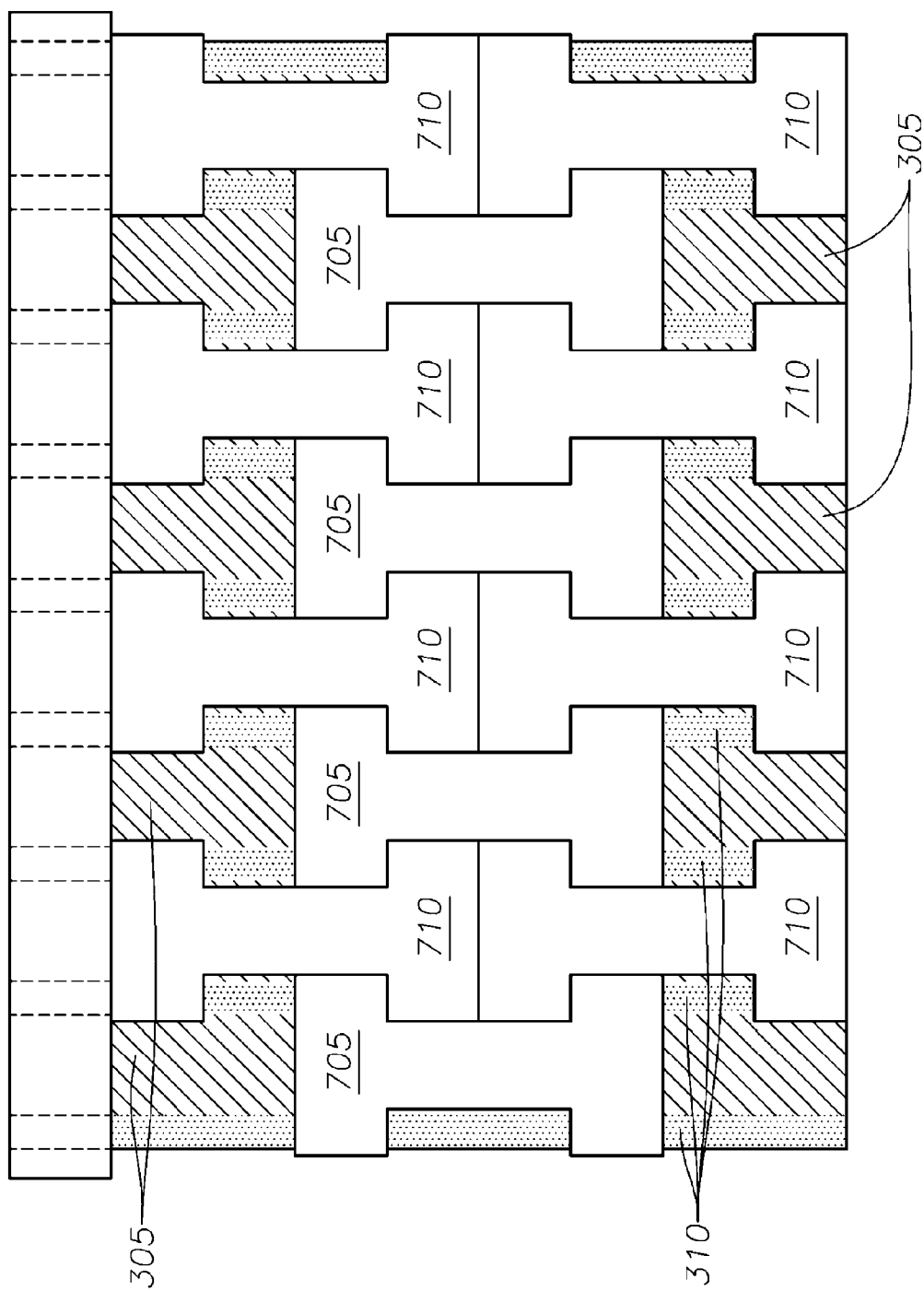
FIG. 7 depicts a schematic view of an illustrative ICMMF that is cut into multiple backsheets for diapers.

FIG. 7 depicts an illustrative schematic of the ICMMF 300 that is cut into multiple backsheets 705 and 710 for diapers. Each backsheet 705 and 710 can have multiple attributes due to the varying attributes of the discrete regions 305A-D, 310A-D. For example, the backsheets 705 and 710 can have an inelastic inner portion due to the attributes of the inelastic regions 305, and elastic side panels due to the elastic attributes of the elastic regions 310. As mentioned above, each discrete region 305 and each discrete region 310 can be the same or different. As such, each backsheet 705 and 710 can be the same or different, depending on the attributes of the respective regions 305, 310 from which it is made. Further, it should be noted that the nesting of the backsheets 705 and 710 produces minimal scrap. It should also be noted that, although not shown, other backsheet designs can be possible in which the side panels are not rectangular and symmetric in shape, but front and rear panels are of different shapes and asymmetric while still maintaining the nested configuration for minimizing scrap.

Rolls of backsheets could be fed into a conventional diaper converting line where additional components could be attached to the backsheet, such as the absorbent core, distribution layer, topsheet, leg barriers, and cuffs. An additional barrier film could be added if the backsheet did not offer sufficient barrier properties.

FIG. 8 depicts an illustrative schematic view of an integrated backsheet for a diaper, according to one or more embodiments. As depicted, the backsheet 800 can include first or front side panels 805A, 810A and second or rear side panels 805B, 810B. The side panels 805A-B, 810A-B can be at least partially made of one or more elastic or extensible materials from the discrete regions 310 and at least partially made of one or more inelastic or extensible materials from the discrete regions 305. The backsheet 800 can further include a central portion or core 820. The core 820 can be made of one or more inelastic or extensible materials from one or more discrete regions 310.

In one or more embodiments, the backsheet 800 can include a continuous web portion 815 that enables a transition from the more rigid/extensible central core 820 to the more elastic side panels 805A-805B, 810A-B. In one or more embodiments, at least one side panel, such as 805A, can include a landing zone 807 for hook attachment.

FIG. 9 depicts an illustrative schematic view of an assembled diaper 900, according to one or more embodiments. The diaper 900 can include the backsheet 800 having the side panels 805A-B, 810A-B, core 820, transition sections 815, and hook portion 807, as described above with regard to FIG. 8. The diaper 900 can further include at lease one absorbent core 905, distribution layer 910, topsheet 915, and leg cuff/barrier 920. In one or more embodiments, the diaper 900 can optionally include an additional barrier film 930.

Articles

In addition to diapers, the ICMMFs and/or composites described herein may be used to form any type of end use article or in any desirable end use application. Such applications include an absorbent or barrier product such as, but not limited to, personal care products, training pants, absorbent underpads, swim wear, wipes, feminine hygiene products, bandages, wound care products, medical garments, surgical gowns, filters, adult incontinence products, surgical drapes, coverings, garments, and cleaning articles and apparatus.

Further embodiments may include:

1. An in situ compositionally modulated meltspun fabric, comprising: at least one layer comprising a plurality of discrete regions of fiber, wherein at least two discrete regions of fiber are inelastic or extensible and at least one discrete region of fiber is elastic or extensible, wherein the layer is compositionally modulated in the cross direction.

2. The fabric of paragraph 1, wherein the at least one discrete elastic region is disposed between the discrete inelastic or extensible regions.

3. The fabric of paragraphs 1 or 2, wherein the at least two discrete regions are extensible.

4. The fabric according to any paragraph 1 to 3, wherein the at least two discrete regions are inelastic.

5. The fabric according to any paragraph 1 to 4, wherein at least one of the at least two discrete inelastic or extensible regions is extensible and at least one of the at least two discrete inelastic or extensible regions is inelastic.

6. The fabric according to any paragraph 1 to 5, wherein at least one of the at least two discrete inelastic or extensible regions is extensible and at least one of the at least two discrete inelastic or extensible regions is inelastic, and wherein the at least one discrete elastic region is disposed between the at least one discrete inelastic region and the at least one discrete extensible region.

7. The fabric according to any paragraph 1 to 6, wherein each discrete region has a different average fiber diameter.

8. The fabric according to any paragraph 1 to 7, wherein each discrete region has the same average fiber diameter.

9. The fabric according to any paragraph 1 to 8, wherein the composition of the fibers in any two adjacent discrete regions is not the same.

10. The fabric according to any paragraph 1 to 9, wherein the number density of the fibers per unit area in any two adjacent discrete regions can be the same.

11. The fabric according to any paragraph 1 to 10, wherein the number density of the fibers per unit area in any two adjacent discrete regions can be different.

12. The fabric according to any paragraph 1 to 11, wherein the cross-sectional shape of the fibers in any two adjacent discrete regions is not the same.

13. The fabric according to any paragraph 1 to 12, wherein the cross-sectional shape of the fibers in any two adjacent discrete regions is the same.

14. The fabric according to any paragraph 1 to 13, wherein the fiber morphology of any two adjacent discrete regions is not the same.

15. The fabric according to any paragraph 1 to 14, wherein the fiber morphology of any two adjacent discrete regions is the same.

16. The fabric according to any paragraph 1 to 15, wherein the thickness of any two adjacent discrete regions is the same or different.

17. The fabric according to any paragraph 1 to 16, wherein the thickness of the fabric varies in the cross direction of the fabric.

18. The fabric according to any paragraph 1 to 17, wherein: each discrete region comprises a different average fiber diameter; the composition of the fibers in adjacent discrete regions is not the same; the number density of the fibers per unit area in adjacent discrete regions is not the same; the cross-sectional shape of the fibers in adjacent discrete regions is not the same; the cross-sectional morphology of the fibers in adjacent discrete regions is not the same; and the thickness of any two adjacent discrete regions varies.

19. The fabric according to any paragraph 1 to 18, wherein each discrete region is formed simultaneously or nearly simultaneously.

20. The fabric according to any paragraph 1 to 19, wherein any two discrete regions are attached to one another through fiber entanglement, adhesion, thermal mechanism, or any combination thereof.

21. The fabric according to any paragraph 1 to 20, wherein each discrete extensible region comprises polyacrylonitrile, polybutylene terephthalate, polyethylene terephthalate (PET), polycyclohexylenedimethylene terephthalate (PCT), polyamide and/or acrylic, RCPs, ICPs or blends of polypropylene and propylene-ethylene copolymers.

22. The fabric according to any paragraph 1 to 21, wherein each discrete inelastic region comprises polyester, homopolypropylene, polypropylene, polyethylene, blends thereof, or blends with one or more polyalphaolefins.

23. The fabric according to any paragraph 1 to 22, wherein the elastic region comprises one or more elastomers selected from the group consisting of propylene-α-olefin copolymer, natural rubber, synthetic polyisoprene, butyl rubber, halogenated butyl rubbers, polybutadiene, styrene-butadiene rubber, styrenic block copolymers, nitrile rubber, hydrogenated nitrile rubbers, chloroprene rubber, polychloroprene, neoprene, ethylene-propylene rubber and ethylene-propylene-diene rubber, epichlorohydrin rubber, polyacrylic rubber, silicone rubber, fluorosilicone rubber, fluoroelastomers, perfluoroelastomers, polyether block amides, chlorosulfonated polyethylene, ethylene-vinyl acetate, ethylene-α-olefin random and block copolymers, thermoplastic elastomers, thermoplastic vulcanizates, thermoplastic polyurethane, thermoplastic olefins, polysulfide rubber, and blends of any two or more thereof.

24. The fabric according to any paragraph 1 to 23, wherein the discrete elastic region comprises a propylene-α-olefin copolymer having and an MFR of less than 80 dg/min, a $H_f$ of less than 80 J/g, and comonomer-derived content within the range from 5 to 30 wt %, based on total weight of the propylene-α-olefin copolymer.

25. The fabric according to any paragraph 1 to 24, wherein the discrete elastic region comprises a propylene-α-olefin copolymer having and an MFR of less than 80 dg/min, a $H_f$ of less than 60 J/g, and ethylene-derived comonomer units within the range of from 5 wt % to 30 wt %, based on total weight of the propylene-α-olefin copolymer.

26. The fabric according to any paragraph 1 to 25, wherein the plurality of discrete regions are substantially parallel to one another.

27. The fabric according to any paragraph 1 to 26, wherein the plurality of discrete regions are substantially parallel to one another in the machine direction.

28. The fabric according to any paragraph 1 to 27, wherein the plurality of discrete regions alternate with respect to one another in the cross direction.

29. The fabric according to any paragraph 1 to 28, wherein the layer is further compositionally modulated in the z-direction.

30. An in situ compositionally modulated meltspun fabric, comprising: at least one layer comprising a plurality of discrete regions of fiber, wherein at least two discrete regions of fiber are inelastic or extensible and at least one discrete region of fiber is elastic or extensible, wherein the layer is compositionally modulated in the cross direction; and at least one facing layer disposed on the layer comprising the plurality of discrete regions of fiber, wherein the facing layer consists essentially of one or more inelastic resins or one or more extensible resins such that the composition is modulated in the z-direction of the fabric.

31. The fabric according to paragraph 30, wherein the at least one discrete elastic region is disposed between the discrete inelastic or extensible regions.

32. The fabric according to paragraphs 30 or 31, wherein the at least two discrete regions are extensible.

33. The fabric according to any paragraph 30 to 32, wherein the at least two discrete regions are inelastic.

34. The fabric according to any paragraph 30 to 33, wherein at least one of the at least two discrete inelastic or extensible regions is extensible and at least one of the at least two discrete inelastic or extensible regions is inelastic.

35. The fabric according to any paragraph 30 to 34, wherein at least one of the at least two discrete inelastic or extensible regions is extensible and at least one of the at least two discrete inelastic or extensible regions is inelastic, and wherein the at least one discrete elastic region is disposed between the at least one discrete inelastic region and the at least one discrete extensible region.

36. The fabric according to any paragraph 30 to 35, wherein each discrete region has a different average fiber diameter.

37. The fabric according to any paragraph 30 to 36, wherein each discrete region has the same average fiber diameter.

38. The fabric according to any paragraph 30 to 37, wherein the composition of the fibers in any two adjacent discrete regions is not the same.

39. The fabric according to any paragraph 30 to 38, wherein the number density of the fibers per unit area in any two adjacent discrete regions can be the same.

40. The fabric according to any paragraph 30 to 39, wherein the number density of the fibers per unit area in any two adjacent discrete regions can be different.

41. The fabric according to any paragraph 30 to 40, wherein the cross-sectional shape of the fibers in any two adjacent discrete regions is not the same.

42. The fabric according to any paragraph 30 to 41, wherein the cross-sectional shape of the fibers in any two adjacent discrete regions is the same.

43. The fabric according to any paragraph 30 to 42, wherein the fiber morphology of any two adjacent discrete regions is not the same.

44. The fabric according to any paragraph 30 to 43, wherein the fiber morphology of any two adjacent discrete regions is the same.

45. The fabric according to any paragraph 30 to 44, wherein the thickness of any two adjacent discrete regions is the same or different.

46. The fabric according to any paragraph 30 to 45, wherein the thickness of the fabric varies in the cross direction of the fabric.

47. The fabric according to any paragraph 30 to 46, wherein: each discrete region comprises a different average fiber diameter; the composition of the fibers in adjacent discrete regions is not the same; the number density of the fibers per unit area in adjacent discrete regions is not the same; the cross-sectional shape of the fibers in adjacent discrete regions is not the same; the cross-sectional morphology of the fibers in adjacent discrete regions is not the same; and the thickness of any two adjacent discrete regions varies.

48. The fabric according to any paragraph 30 to 47, wherein each discrete region is formed simultaneously or nearly simultaneously.

49. The fabric according to any paragraph 30 to 48, wherein any two discrete regions are attached to one another through fiber entanglement, adhesion, thermal mechanism, or any combination thereof.

50. The fabric according to any paragraph 30 to 49, wherein each discrete extensible region comprises polyacrylonitrile, polybutylene terephthalate, polyethylene terephthalate (PET), polycyclohexylenedimethylene terephthalate (PCT), polyamide and/or acrylic, RCPs, ICPs or blends of polypropylene and propylene-ethylene copolymers.

51. The fabric according to any paragraph 30 to 50, wherein each discrete inelastic region comprises polyester, homopolypropylene, polypropylene, polyethylene, blends thereof, or blends with one or more polyalphaolefins.

52. The fabric according to any paragraph 30 to 51, wherein the elastic region comprises one or more elastomers selected from the group consisting of propylene-α-olefin copolymer, natural rubber, synthetic polyisoprene, butyl rubber, halogenated butyl rubbers, polybutadiene, styrene-butadiene rubber, styrenic block copolymers, nitrile rubber, hydrogenated nitrile rubbers, chloroprene rubber, polychloroprene, neoprene, ethylene-propylene rubber and ethylene-propylene-diene rubber, epichlorohydrin rubber, polyacrylic rubber, silicone rubber, fluorosilicone rubber, fluoroelastomers, perfluoroelastomers, polyether block amides, chlorosulfonated polyethylene, ethylene-vinyl acetate, ethylene-α-olefin random and block copolymers, thermoplastic elastomers, thermoplastic vulcanizates, thermoplastic polyurethane, thermoplastic olefins, polysulfide rubber, and blends of any two or more thereof.

53. The fabric according to any paragraph 30 to 52, wherein the discrete elastic region comprises a propylene-α-olefin copolymer having and an MFR of less than 80 dg/min, a $H_f$ of less than 80 J/g, and comonomer-derived content within the range from 5 to 30 wt %, based on total weight of the propylene-α-olefin copolymer.

54. The fabric according to any paragraph 30 to 53, wherein the discrete elastic region comprises a propylene-α-olefin copolymer having and an MFR of less than 80 dg/min, a $H_f$ of less than 60 J/g, and ethylene-derived comonomer units within the range of from 5 wt % to 30 wt %, based on total weight of the propylene-α-olefin copolymer.

55. The fabric according to any paragraph 30 to 54, wherein the plurality of discrete regions are substantially parallel to one another.

56. The fabric according to any paragraph 30 to 55, wherein the plurality of discrete regions are substantially parallel to one another in the machine direction.

57. The fabric according to any paragraph 30 to 56, wherein the plurality of discrete regions alternate with respect to one another in the cross direction.

58. The fabric according to any paragraph 30 to 57, wherein the layer is further compositionally modulated in the z-direction.

59. An in situ compositionally modulated meltspun fabric, comprising: a first layer comprising a plurality of discrete regions of fiber, wherein at least two discrete regions of fiber are inelastic or extensible and at least one discrete region of fiber is elastic or extensible; and a second layer comprising a plurality of discrete regions of fiber, wherein at least two discrete regions of fiber are inelastic or extensible and at least one discrete region of fiber is elastic or extensible, wherein the first and second layers are each compositionally modulated in the cross direction.

60. The fabric according to paragraph 59, further comprising at least one facing layer disposed on the first layer, the second layer, or both the first and second layers, the facing layer consisting essentially of one or more inelastic resins or one or more extensible resins.

61. The fabric according to paragraphs 59 or 60, wherein the discrete regions of fiber of the first layer are at least partially disposed on the discrete regions of fiber of the second layer.

62. The fabric according to any paragraph 59 to 61, wherein the inelastic or extensible discrete regions of fiber of the first layer are at least partially disposed on the inelastic or extensible discrete regions of fiber of the second layer.

63. The fabric according to any paragraph 59 to 62, wherein the elastic discrete regions of fiber of the first layer are at least partially disposed on the elastic discrete regions of fiber of the second layer.

64. The fabric according to any paragraph 59 to 63, wherein the inelastic or extensible discrete regions of fiber of the first layer are at least partially disposed on the elastic discrete regions of fiber of the second layer.

65. The fabric according to any paragraph 59 to 64, wherein the elastic discrete regions of fiber of the first layer are at least partially disposed on the inelastic or extensible discrete regions of fiber of the second layer.

66. The fabric according to any paragraph 59 to 65, wherein the at least one discrete elastic region is disposed between the discrete inelastic or extensible regions.

67. The fabric according to any paragraph 59 to 66, wherein the at least two discrete regions are extensible.

68. The fabric according to any paragraph 59 to 67, wherein the at least two discrete regions are inelastic.

69. The fabric according to any paragraph 59 to 68, wherein at least one of the at least two discrete inelastic or extensible regions is extensible and at least one of the at least two discrete inelastic or extensible regions is inelastic.

70. The fabric according to any paragraph 59 to 69, wherein at least one of the at least two discrete inelastic or extensible regions is extensible and at least one of the at least two discrete inelastic or extensible regions is inelastic, and wherein the at least one discrete elastic region is disposed between the at least one discrete inelastic region and the at least one discrete extensible region.

71. The fabric according to any paragraph 59 to 70, wherein each discrete region has a different average fiber diameter.

72. The fabric according to any paragraph 59 to 71, wherein each discrete region has the same average fiber diameter.

73. The fabric according to any paragraph 59 to 72, wherein the composition of the fibers in any two adjacent discrete regions is not the same.

74. The fabric according to any paragraph 59 to 73, wherein the number density of the fibers per unit area in any two adjacent discrete regions can be the same.

75. The fabric according to any paragraph 59 to 74, wherein the number density of the fibers per unit area in any two adjacent discrete regions can be different.

76. The fabric according to any paragraph 59 to 75, wherein the cross-sectional shape of the fibers in any two adjacent discrete regions is not the same.

77. The fabric according to any paragraph 59 to 76, wherein the cross-sectional shape of the fibers in any two adjacent discrete regions is the same.

78. The fabric according to any paragraph 59 to 77, wherein the fiber morphology of any two adjacent discrete regions is not the same.

79. The fabric according to any paragraph 59 to 78, wherein the fiber morphology of any two adjacent discrete regions is the same.

80. The fabric according to any paragraph 59 to 79, wherein the thickness of any two adjacent discrete regions is the same or different.

81. The fabric according to any paragraph 59 to 80, wherein the thickness of the fabric varies in the cross direction of the fabric.

82. The fabric according to any paragraph 59 to 81, wherein: each discrete region comprises a different average fiber diameter; the composition of the fibers in adjacent discrete regions is not the same; the number density of the fibers per unit area in adjacent discrete regions is not the same; the cross-sectional shape of the fibers in adjacent discrete regions is not the same; the cross-sectional morphology of the fibers in adjacent discrete regions is not the same; and the thickness of any two adjacent discrete regions varies.

83. The fabric according to any paragraph 59 to 82, wherein each discrete region is formed simultaneously or nearly simultaneously.

84. The fabric according to any paragraph 59 to 83, wherein any two discrete regions are attached to one another through fiber entanglement, adhesion, thermal mechanism, or any combination thereof.

85. The fabric according to any paragraph 59 to 84, wherein each discrete extensible region comprises polyacrylonitrile, polybutylene terephthalate, polyethylene terephthalate (PET), polycyclohexylenedimethylene terephthalate (PCT), polyamide and/or acrylic, RCPs, ICPs or blends of polypropylene and propylene-ethylene copolymers.

86. The fabric according to any paragraph 59 to 85, wherein each discrete inelastic region comprises polyester, homopolypropylene, polypropylene, polyethylene, blends thereof, or blends with one or more polyalphaolefins.

87. The fabric according to any paragraph 59 to 86, wherein the elastic region comprises one or more elastomers selected from the group consisting of propylene-α-olefin copolymer, natural rubber, synthetic polyisoprene, butyl rubber, halogenated butyl rubbers, polybutadiene, styrene-butadiene rubber, styrenic block copolymers, nitrile rubber, hydrogenated nitrile rubbers, chloroprene rubber, polychloroprene, neoprene, ethylene-propylene rubber and ethylene-propylene-diene rubber, epichlorohydrin rubber, polyacrylic rubber, silicone rubber, fluorosilicone rubber, fluoroelastomers, perfluoroelastomers, polyether block amides, chlorosulfonated polyethylene, ethylene-vinyl acetate, ethylene-α-olefin random and block copolymers, thermoplastic elastomers, thermoplastic vulcanizates, thermoplastic polyurethane, thermoplastic olefins, polysulfide rubber, and blends of any two or more thereof.

88. The fabric according to any paragraph 59 to 87, wherein the discrete elastic region comprises a propylene-α-olefin copolymer having and an MFR of less than 80 dg/min, a $H_f$ of less than 80 J/g, and comonomer-derived content within the range from 5 to 30 wt %, based on total weight of the propylene-α-olefin copolymer.

89. The fabric according to any paragraph 59 to 88, wherein the discrete elastic region comprises a propylene-α-olefin copolymer having and an MFR of less than 80 dg/min, a $H_f$ of less than 60 J/g, and ethylene-derived comonomer units within the range of from 5 wt % to 30 wt %, based on total weight of the propylene-α-olefin copolymer.

90. The fabric according to any paragraph 59 to 89, wherein the plurality of discrete regions are substantially parallel to one another.

91. The fabric according to any paragraph 59 to 90, wherein the plurality of discrete regions are substantially parallel to one another in the machine direction.

92. The fabric according to any paragraph 59 to 91, wherein the plurality of discrete regions alternate with respect to one another in the cross direction.

93. The fabric according to any paragraph 59 to 92, wherein the layer is further compositionally modulated in the z-direction.

94. A method for forming an in situ meltspun fabric, comprising: extruding one or more elastic or extensible resins through one or more dies having a plurality of nozzles to form a first plurality of continuous fibers; extruding one or more inelastic resins or extensible through one or more dies simultaneously or nearly simultaneously with the one or more elastic resins to form a second plurality of continuous fibers, wherein: the plurality of nozzles are separated into at least a first set of discrete zones and at least a second set of discrete zones, and the first set of discrete zones are used to extrude the one or more elastic or extensible resins and the second set of discrete zones are used to extrude the one or more inelastic or extensible resins.

95. The method according to paragraph 94, wherein the at least one discrete elastic region is disposed between the discrete inelastic or extensible regions.

96. The method according to paragraphs 94 or 95, wherein the at least two discrete regions are extensible.

97. The method according to any paragraph 94 to 96, wherein the at least two discrete regions are inelastic.

98. The method according to any paragraph 94 to 97, wherein at least one of the at least two discrete inelastic or extensible regions is extensible and at least one of the at least two discrete inelastic or extensible regions is inelastic.

99. The method according to any paragraph 94 to 98, wherein at least one of the at least two discrete inelastic or extensible regions is extensible and at least one of the at least two discrete inelastic or extensible regions is inelastic, and wherein the at least one discrete elastic region is disposed between the at least one discrete inelastic region and the at least one discrete extensible region.

100. The method according to any paragraph 94 to 99, wherein each discrete region has a different average fiber diameter.

101. The method according to any paragraph 94 to 100, wherein each discrete region has the same average fiber diameter.

102. The method according to any paragraph 94 to 101, wherein the composition of the fibers in any two adjacent discrete regions is not the same.

103. The method according to any paragraph 94 to 102, wherein the number density of the fibers per unit area in any two adjacent discrete regions can be the same.

104. The method according to any paragraph 94 to 103, wherein the number density of the fibers per unit area in any two adjacent discrete regions can be different.

105. The method according to any paragraph 94 to 104, wherein the cross-sectional shape of the fibers in any two adjacent discrete regions is not the same.

106. The method according to any paragraph 94 to 105, wherein the cross-sectional shape of the fibers in any two adjacent discrete regions is the same.

107. The method according to any paragraph 94 to 106, wherein the fiber morphology of any two adjacent discrete regions is not the same.

108. The method according to any paragraph 94 to 107, wherein the fiber morphology of any two adjacent discrete regions is the same.

109. The method according to any paragraph 94 to 108, wherein the thickness of any two adjacent discrete regions is the same or different.

110. The method according to any paragraph 94 to 109, wherein the thickness of the fabric varies in the cross direction of the fabric.

111. The method according to any paragraph 94 to 110, wherein: each discrete region comprises a different average fiber diameter; the composition of the fibers in adjacent discrete regions is not the same; the number density of the fibers per unit area in adjacent discrete regions is not the same; the cross-sectional shape of the fibers in adjacent discrete regions is not the same; the cross-sectional morphology of the fibers in adjacent discrete regions is not the same; and the thickness of any two adjacent discrete regions varies.

112. The method according to any paragraph 94 to 111, wherein each discrete region is formed simultaneously or nearly simultaneously.

113. The method according to any paragraph 94 to 112, wherein any two discrete regions are attached to one another through fiber entanglement, adhesion, thermal mechanism, or any combination thereof.

114. The method according to any paragraph 94 to 113, wherein each discrete extensible region comprises polyacrylonitrile, polybutylene terephthalate, polyethylene terephthalate (PET), polycyclohexylenedimethylene terephthalate (PCT), polyamide and/or acrylic, RCPs, ICPs or blends of polypropylene and propylene-ethylene copolymers.

115. The method according to any paragraph 94 to 114, wherein each discrete inelastic region comprises polyester, homopolypropylene, polypropylene, polyethylene, blends thereof, or blends with one or more polyalphaolefins.

116. The method according to any paragraph 94 to 115, wherein the elastic region comprises one or more elastomers selected from the group consisting of propylene-α-olefin copolymer, natural rubber, synthetic polyisoprene, butyl rubber, halogenated butyl rubbers, polybutadiene, styrene-butadiene rubber, styrenic block copolymers, nitrile rubber, hydrogenated nitrile rubbers, chloroprene rubber, polychloroprene, neoprene, ethylene-propylene rubber and ethylene-propylene-diene rubber, epichlorohydrin rubber, polyacrylic rubber, silicone rubber, fluorosilicone rubber, fluoroelastomers, perfluoroelastomers, polyether block amides, chlorosulfonated polyethylene, ethylene-vinyl acetate, ethylene-α-olefin random and block copolymers, thermoplastic elastomers, thermoplastic vulcanizates, thermoplastic polyurethane, thermoplastic olefins, polysulfide rubber, and blends of any two or more thereof.

117. The method according to any paragraph 94 to 116, wherein the discrete elastic region comprises a propylene-α-olefin copolymer having and an MFR of less than 80 dg/min, a $H_f$ of less than 80 J/g, and comonomer-derived content within the range from 5 to 30 wt %, based on total weight of the propylene-α-olefin copolymer.

118. The method according to any paragraph 94 to 117, wherein the discrete elastic region comprises a propylene-α-olefin copolymer having and an MFR of less than 80 dg/min, a $H_f$ of less than 60 J/g, and ethylene-derived comonomer units within the range of from 5 wt % to 30 wt %, based on total weight of the propylene-α-olefin copolymer.

119. The method according to any paragraph 94 to 118, wherein the plurality of discrete regions are substantially parallel to one another.

120. The method according to any paragraph 94 to 119, wherein the plurality of discrete regions are substantially parallel to one another in the machine direction.

121. The method according to any paragraph 94 to 120, wherein the plurality of discrete regions alternate with respect to one another in the cross direction.

122. The method according to any paragraph 94 to 121, wherein the layer is further compositionally modulated in the z-direction.

123. A garment comprising the in situ compositionally modulated meltspun fabric according to any paragraph 1 to 93.

124. A diaper comprising the in situ compositionally modulated meltspun fabric according to any paragraph 1 to 93.

125. A garment made from the method according to any paragraph 94 to 122.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, patent publications, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. An in situ compositionally modulated meltspun fabric, comprising:
   at least one layer comprising a plurality of discrete regions of fiber, wherein at least two discrete regions of fiber are inelastic or extensible and at least one discrete region of fiber is elastic, wherein the layer is compositionally modulated in the cross direction,
   wherein the discrete region of fiber that is elastic comprises a propylene-α-olefin copolymer that comprises propylene-derived units and 5 to 30 wt % of comonomer-derived units, based on the weight of the propylene-α-olefin, where the propylene-α-olefin copolymer has a melting point of less than 105° C.

2. The fabric of claim 1, wherein the at least one discrete elastic region is disposed between the discrete inelastic or extensible regions.

3. The fabric of claim 1, wherein at least one of the at least two discrete inelastic or extensible regions is extensible and at least one of the at least two discrete inelastic or extensible regions is inelastic.

4. The fabric of claim 1, wherein at least one of the at least two discrete inelastic or extensible regions is extensible and at least one of the at least two discrete inelastic or extensible regions is inelastic, and wherein the at least one discrete elastic region is disposed between the at least one discrete inelastic region and the at least one discrete extensible region.

5. The fabric of claim 1, wherein the thickness of any two adjacent discrete regions is the same or different.

6. The fabric of claim 1, wherein the thickness of the fabric varies in the cross direction of the fabric.

7. The fabric of claim 1, wherein:
   each discrete extensible region comprises polyacrylonitrile, polybutylene terephthalate, polyethylene terephthalate (PET), polycyclohexylenedimethylene terephthalate (PCT), polyamide and/or acrylic, RCPs, ICPs or blends of polypropylene and propylene-ethylene copolymers; and each discrete inelastic region comprises polyester, homopolypropylene, polypropylene, polyethylene, blends thereof, or blends with one or more polyalphaolefins.

8. The fabric of claim 1, wherein the discrete elastic region comprises a propylene-α-olefin copolymer having and an MFR of less than 80 dg/min, a $H_f$ of less than 80 J/g, and comonomer-derived content within the range from 5 to 30 wt %, based on total weight of the propylene-α-olefin copolymer.

9. The fabric of claim 1, wherein:
the plurality of discrete regions are substantially parallel to one another in the machine direction;
the plurality of discrete regions alternate with respect to one another in the cross direction; and
the layer is compositionally modulated in the z-direction.

10. An in situ compositionally modulated meltspun fabric, comprising:
at least one layer comprising a plurality of discrete regions of fiber, wherein at least two discrete regions of fiber are inelastic or extensible and at least one discrete region of fiber is elastic, wherein the layer is compositionally modulated in the cross direction,
wherein the discrete region of fiber that is elastic comprises a propylene-α-olefin copolymer that comprises propylene-derived units and 5 to 30 wt % of comonomer-derived units, based on the weight of the propylene-α-olefin, where the propylene-α-olefin copolymer has a melting point of less than 105° C.; and
at least one facing layer disposed on the layer comprising the plurality of discrete regions of fiber, wherein the facing layer consists essentially of one or more inelastic resins or one or more extensible resins such that the composition is modulated in the z-direction of the fabric.

11. The fabric of claim 10, wherein:
each discrete region comprises a different average fiber diameter;
the composition of the fibers in adjacent discrete regions is not the same;
the number density of the fibers per unit area in adjacent discrete regions is not the same;
the cross-sectional shape of the fibers in adjacent discrete regions is not the same;
the cross-sectional morphology of the fibers in adjacent discrete regions is not the same; and
the thickness of any two adjacent discrete regions varies.

12. The fabric of claim 10, wherein at least one of the at least two discrete inelastic or extensible regions is extensible and at least one of the at least two discrete inelastic or extensible regions is inelastic, and wherein the at least one discrete elastic region is disposed between the at least one discrete inelastic region and the at least one discrete extensible region.

13. The fabric of claim 10, wherein:
each discrete extensible region comprises polyacrylonitrile, polybutylene terephthalate, polyethylene terephthalate (PET), polycyclohexylenedimethylene terephthalate (PCT), polyamide and/or acrylic, RCPs, ICPs or blends of polypropylene and propylene-ethylene copolymers; and each discrete inelastic region comprises polyester, homopolypropylene, polypropylene, polyethylene, blends thereof, or blends with one or more polyalphaolefins.

14. The fabric of claim 10, wherein the discrete elastic region comprises a propylene-α-olefin copolymer having and an MFR of less than 80 dg/min, a $H_f$ of less than 80 J/g, and comonomer-derived content within the range from 5 to 30 wt %, based on total weight of the propylene-α-olefin copolymer.

15. The fabric of claim 10, wherein:
the plurality of discrete regions are substantially parallel to one another in the machine direction;
the plurality of discrete regions alternate with respect to one another in the cross direction; and
the layer is compositionally modulated in the z-direction.

16. An in situ compositionally modulated meltspun fabric, comprising:
a first layer comprising a plurality of discrete regions of fiber, wherein at least two discrete regions of fiber are inelastic or extensible and at least one discrete region of fiber is elastic or extensible,
wherein the discrete region of fiber that is elastic comprises a propylene-α-olefin copolymer that comprises propylene-derived units and 5 to 30 wt % of comonomer-derived units, based on the weight of the propylene-α-olefin, where the propylene-α-olefin copolymer has a melting point of less than 105° C.; and
a second layer comprising a plurality of discrete regions of fiber, wherein at least two discrete regions of fiber are inelastic or extensible and at least one discrete region of fiber is elastic or extensible, wherein the first and second layers are each compositionally modulated in the cross direction.

17. The fabric of claim 16, further comprising at least one facing layer disposed on the first layer, the second layer, or both the first and second layers, the facing layer consisting essentially of one or more inelastic resins or one or more extensible resins.

18. The fabric of claim 16, wherein the discrete regions of fiber of the first layer are at least partially disposed on the discrete regions of fiber of the second layer.

19. The fabric of claim 16, wherein the inelastic or extensible discrete regions of fiber of the first layer are at least partially disposed on the inelastic or extensible discrete regions of fiber of the second layer.

20. The fabric of claim 16, wherein the elastic discrete regions of fiber of the first layer are at least partially disposed on the elastic discrete regions of fiber of the second layer.

21. The fabric of claim 16, wherein the inelastic or extensible discrete regions of fiber of the first layer are at least partially disposed on the elastic discrete regions of fiber of the second layer.

22. The fabric of claim 16, wherein the elastic discrete regions of fiber of the first layer are at least partially disposed on the inelastic or extensible discrete regions of fiber of the second layer.

23. A garment comprising the in situ compositionally modulated meltspun fabric of claim 1.

24. A diaper comprising the in situ compositionally modulated meltspun fabric of claim 1.

* * * * *